United States Patent
Cao et al.

(10) Patent No.: US 12,120,748 B2
(45) Date of Patent: Oct. 15, 2024

(54) TWO-STEP RANDOM ACCESS CHANNEL CONFIGURATION

(71) Applicant: Qualcomm Incorporated, San Diego, CA (US)

(72) Inventors: Yiqing Cao, Beijing (CN); Jing Lei, San Diego, CA (US); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 17/608,650

(22) PCT Filed: May 14, 2020

(86) PCT No.: PCT/CN2020/090302
§ 371 (c)(1),
(2) Date: Nov. 3, 2021

(87) PCT Pub. No.: WO2020/228785
PCT Pub. Date: Nov. 19, 2020

(65) Prior Publication Data
US 2022/0240321 A1    Jul. 28, 2022

(30) Foreign Application Priority Data

May 15, 2019   (WO) ................ PCT/CN2019/086959

(51) Int. Cl.
*H04W 74/0833* (2024.01)
*H04L 5/00* (2006.01)
*H04W 74/00* (2009.01)

(52) U.S. Cl.
CPC ....... *H04W 74/0833* (2013.01); *H04L 5/0048* (2013.01); *H04W 74/004* (2013.01)

(58) Field of Classification Search
None
See application file for complete search history.

(56) References Cited

U.S. PATENT DOCUMENTS 10,142,980 B2   11/2018  Radulescu et al.
2020/0137792 A1*  4/2020  Yoon ..................... H04W 74/08
(Continued)

FOREIGN PATENT DOCUMENTS

CN    101094511 A   12/2007
CN    108271214 A    7/2018
(Continued)

OTHER PUBLICATIONS

Taiwan Search Report—TW109116034—TIPO—Dec. 18, 2023.
(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communications are described. A wireless device may receive a configuration for a first random access message of a two-step random access channel procedure. The wireless device may select a subcarrier spacing and a number of demodulation reference signal occurrences for transmitting the first random access message based at least in part on the configuration and a speed of the wireless device. The wireless device may transmit the first random access message of the two-step random access channel procedure using the subcarrier spacing and the number of demodulation reference signal occurrences.

30 Claims, 15 Drawing Sheets

(56) References Cited

U.S. PATENT DOCUMENTS

| | | | | |
|---|---|---|---|---|
| 2020/0146000 | A1* | 5/2020 | Shin | H04L 27/3809 |
| 2021/0152301 | A1* | 5/2021 | Saito | H04L 5/0051 |
| 2021/0399857 | A1* | 12/2021 | Baldemair | H04W 16/14 |
| 2022/0086741 | A1* | 3/2022 | Liao | H04W 4/44 |
| 2022/0124469 | A1* | 4/2022 | Liao | H04L 67/34 |
| 2022/0132583 | A1* | 4/2022 | Ko | H04W 74/0833 |
| 2022/0140956 | A1* | 5/2022 | Park | H04W 72/20 370/329 |
| 2022/0180748 | A1* | 6/2022 | Kwak | G08G 1/16 |
| 2022/0210804 | A1* | 6/2022 | Hwang | H04L 5/0053 |
| 2022/0240321 | A1* | 7/2022 | Cao | H04W 74/004 |
| 2022/0416871 | A1* | 12/2022 | Xu | H04W 16/28 |
| 2023/0144649 | A1* | 5/2023 | Cirik | H04W 76/19 370/216 |

FOREIGN PATENT DOCUMENTS

| | | |
|---|---|---|
| CN | 108702698 A | 10/2018 |
| WO | WO-2017147550 A1 | 8/2017 |
| WO | WO-2018133437 A1 | 7/2018 |
| WO | WO-2018203674 A1 | 11/2018 |

OTHER PUBLICATIONS

CATT: "Considerations on Synchronization Mechanism in NR V2X", 3GPP Draft, 3GPP TSG RAN WG1 Meeting #94, R1-1808401, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 19, 2018-Aug. 24, 2018, Aug. 11, 2018 (Aug. 11, 2018), XP051515783, 4 pages, Retrieved from the Internet: URL: http://www.3gpp.org/ftp/tsg%5Fran/WG1%5FRL1/TSGR1%5F94/Docs/R1%2D1808401%2Ezip [retrieved on Aug. 11, 2018].

CATT: "Sidelink Physical Layer Structure in NR V2X", 3GPP TSG RAN WG1 Meeting #97, R1-1906314, Reno, USA, May 13-17, 2019, May 4, 2019 (May 4, 2019), Section 5, 15 Pages.

International Search Report and Written Opinion—PCT/CN2019/086959—ISA/EPO—Feb. 6, 2020.

International Search Report and Written Opinion—PCT/CN2020/090302—ISAEPO—Jul. 29, 2020.

Fujitsu: "On Procedure Selection among 2-step and 4-step RACH", 3GPP TSG-RAN WG2 Meeting #106, R2-1906256, On Procedure Selection Among 2-Step And 4-Step Rach, 3rd Generation Partnership Project, Mobile Competence Centre, 650, Route Des Lucioles, F-06921 Sophia-Antipolis CED, vol. RAN WG2, No. Reno, USA, May 13, 2019-May 17, 2019, XP051710576, Section 2, pp. 1-4.

3GPP TS 38.304: "3rd Generation Partnership Project, Technical Specification Group Radio Access Network, NR, User Equipment (UE) Procedures in Idle Mode and RRC Inactive State (Release 15)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V15.3.0 (Mar. 2019), Apr. 13, 2019, pp. 1-29, XP051723425, 5.2 Cell Selection and Reselection Paragraph [5.2.4.7.1].

Ericsson: "NR-RACH Preamble Format Details", R1-1711380, 3GPP TSG RAN WG1 NR Ad-Hoc#2, R1-1711380_NR-RACH Preamble Format Details, 3rd Generation Partnership Project, Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017, XP051300569, pp. 1-16, Title and Introduction, p. 1, p. 5, paragraph 2.1.2, p. 8, paragraph 3.

Qualcomm Incorporated: "Two-Step RACH Fall Back to Four-Step RACH", 3GPP TSG-RAN WG2 Meeting #105bis, R2-1904971, 3rd Generation Partnership Project, Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019, XP051702250, Agreements section, item 6, p. 1, paragraph 1, 3 Pages.

Supplementary European Search Report—EP20806834—Search Authority—The Hague—Jan. 3, 2023.

* cited by examiner

TWO-STEP RANDOM ACCESS CHANNEL CONFIGURATION

CROSS REFERENCE TO RELATED APPLICATIONS

The present Application is a 371 national stage filing of International Patent No. PCT/CN2020/090302 by Cao et. al., entitled "TWO-STEP RANDOM ACCESS CHANNEL CONFIGURATION," filed May 14, 2020, and claims priority to International Patent Application No. PCT/CN2019/086959 by Cao et. al., entitled "TWO-STEP RANDOM ACCESS CHANNEL CONFIGURATION," filed May 15, 2019, each of which is assigned to the assignee hereof, and each of which is expressly incorporated by reference in its entirety herein.

BACKGROUND

The following relates generally to wireless communications, and more specifically to two-step random access channel configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support random access channel procedures with wireless devices traveling at high speeds. Conventional techniques for high speed random access channel procedures may have some deficiencies and can be improved.

SUMMARY

The described techniques relate to improved methods, systems, devices, and apparatuses that support two-step random access channel configuration. Some wireless communications systems may support a two-step random access channel procedure and communications with devices traveling at high speeds. For example, a user equipment (UE) may transmit a first random access message to a base station and receive a second random access response, after which the random access channel procedure is complete, and the UE has a Radio Resource Control (RRC) connection established with the base station. Techniques described herein may support configurations which use additional demodulation reference signal (DMRS) occurrences and larger subcarrier spacing for the first random access message when transmitting the first random access message in a high speed scenario. A base station may transmit a configuration for the first random access message of a two-step random access channel procedure to a UE. The configuration may include indicators of, or possible values for, a subcarrier spacing and a number of DMRS occurrences for the first random access message of the two-step random access channel procedure.

The UE may select a subcarrier spacing and a number of DMRS occurrences for the first random access message based on the configuration. In a first example, the UE may select a subcarrier spacing and number of DMRS occurrences based on a speed of the UE. For example, there may be different speed thresholds which correspond to different configurations or subcarrier spacings and DMRS occurrence quantities. In some examples, some cells may support or configure the high speed configurations. For example, a cell may only support configurations which are used in high speed situations. In some cases, the UE may indicate the selected subcarrier spacing and number of DMRS occurrences to the base station. In some cases, the indication may be transmitted (e.g., via piggybacking) on an uplink shared channel.

A method of wireless communications at a wireless device is described. The method may include receiving a configuration for a first random access message of a two-step random access channel procedure, selecting a subcarrier spacing and a number of DMRS occurrences for transmitting the first random access message based on the configuration and a speed of the wireless device, and transmitting the first random access message of the two-step random access channel procedure using the subcarrier spacing and the number of DMRS occurrences.

An apparatus for wireless communications at a wireless device is described. The apparatus may include a processor, memory in electronic communication with the processor, and instructions stored in the memory. The instructions may be executable by the processor to cause the apparatus to receive a configuration for a first random access message of a two-step random access channel procedure, select a subcarrier spacing and a number of DMRS occurrences for transmitting the first random access message based on the configuration and a speed of the wireless device, and transmit the first random access message of the two-step random access channel procedure using the subcarrier spacing and the number of DMRS occurrences.

Another apparatus for wireless communications at a wireless device is described. The apparatus may include means for receiving a configuration for a first random access message of a two-step random access channel procedure, selecting a subcarrier spacing and a number of DMRS occurrences for transmitting the first random access message based on the configuration and a speed of the wireless device, and transmitting the first random access message of the two-step random access channel procedure using the subcarrier spacing and the number of DMRS occurrences.

A non-transitory computer-readable medium storing code for wireless communications at a wireless device is described. The code may include instructions executable by a processor to receive a configuration for a first random access message of a two-step random access channel procedure, select a subcarrier spacing and a number of DMRS occurrences for transmitting the first random access message based on the configuration and a speed of the wireless device, and transmit the first random access message of the two-step random access channel procedure using the subcarrier spacing and the number of DMRS occurrences.

In some examples of the method, apparatuses, and non-transitory computer-readable medium described herein, the configuration includes a set of combinations for the subcarrier spacing and the number of DMRS occurrences.

In some examples of the method, apparatuses, and non-transitory computer-readable medium described herein, the selecting may include operations, features, means, or instructions for selecting a configuration identification corresponding to a combination of the set of combinations for the subcarrier spacing and the number of DMRS occurrences.

In some examples of the method, apparatuses, and non-transitory computer-readable medium described herein, the configuration includes a first parameter for the subcarrier spacing and a second parameter for the number of DMRS occurrences.

In some examples of the method, apparatuses, and non-transitory computer-readable medium described herein, the selecting may include operations, features, means, or instructions for independently selecting the subcarrier spacing based on the first parameter and the number of DMRS occurrences based on the second parameter.

Some examples of the method, apparatuses, and non-transitory computer-readable medium described herein may further include operations, features, means, or instructions for selecting the subcarrier spacing and the number of DMRS occurrences based on the speed of the wireless device exceeding a threshold.

Some examples of the method, apparatuses, and non-transitory computer-readable medium described herein may further include operations, features, means, or instructions for transmitting an indication of the selected subcarrier spacing and the number of DMRS occurrences.

In some examples of the method, apparatuses, and non-transitory computer-readable medium described herein, the indication may be included in a PUSCH of the first random access message.

In some examples of the method, apparatuses, and non-transitory computer-readable medium described herein, the indication may be transmitted in uplink control information on a physical uplink control channel.

In some examples of the method, apparatuses, and non-transitory computer-readable medium described herein, the indication includes a first parameter for the selected subcarrier spacing and a second parameter for the number of DMRS occurrences.

In some examples of the method, apparatuses, and non-transitory computer-readable medium described herein, the indication includes a configuration identification to indicate the subcarrier spacing and the number of DMRS occurrences.

In some examples of the method, apparatuses, and non-transitory computer-readable medium described herein, the indication includes sequences, frequency position information, or both, for DMRS corresponding to the number of DMRS occurrences.

In some examples of the method, apparatuses, and non-transitory computer-readable medium described herein, the configuration may be received in a system information message.

Some examples of the method, apparatuses, and non-transitory computer-readable medium described herein may further include operations, features, means, or instructions for transmitting a request for the system information message, where the system information message may be received based on the request.

Some examples of the method, apparatuses, and non-transitory computer-readable medium described herein may further include operations, features, means, or instructions for determining the speed of the wireless device may be below a threshold, and registering to another cell based on the determining.

In some examples of the method, apparatuses, and non-transitory computer-readable medium described herein, the number of DMRS occurrences includes occurrences for a front loaded DMRS and at least one additional DMRS.

In some examples of the method, apparatuses, and non-transitory computer-readable medium described herein, the at least one additional DMRS uses a same sequence, frequency location, or both, as the front loaded DMRS.

In some examples of the method, apparatuses, and non-transitory computer-readable medium described herein, the at least one additional DMRS uses a different sequence, frequency location, or both, than the front loaded DMRS.

In some examples of the method, apparatuses, and non-transitory computer-readable medium described herein, the wireless device may be a UE or a relay node.

A method of wireless communications is described. The method may include transmitting, to a first wireless device, a configuration for a first random access message of a two-step random access channel procedure and receiving the first random access message of the two-step random access channel procedure using a subcarrier spacing and a number of DMRS occurrences, where the subcarrier spacing and the number of DMRS occurrences are based on the configuration and a speed of the first wireless device.

An apparatus for wireless communications is described. The apparatus may include a processor, memory in electronic communication with the processor, and instructions stored in the memory. The instructions may be executable by the processor to cause the apparatus to transmit, to a first wireless device, a configuration for a first random access message of a two-step random access channel procedure and receive the first random access message of the two-step random access channel procedure using a subcarrier spacing and a number of DMRS occurrences, where the subcarrier spacing and the number of DMRS occurrences are based on the configuration and a speed of the first wireless device.

Another apparatus for wireless communications is described. The apparatus may include means for transmitting, to a first wireless device, a configuration for a first random access message of a two-step random access channel procedure and receiving the first random access message of the two-step random access channel procedure using a subcarrier spacing and a number of DMRS occurrences, where the subcarrier spacing and the number of DMRS occurrences are based on the configuration and a speed of the first wireless device.

A non-transitory computer-readable medium storing code for wireless communications is described. The code may include instructions executable by a processor to transmit, to a first wireless device, a configuration for a first random access message of a two-step random access channel procedure and receive the first random access message of the two-step random access channel procedure using a subcarrier spacing and a number of DMRS occurrences, where the subcarrier spacing and the number of DMRS occurrences are based on the configuration and a speed of the first wireless device.

In some examples of the method, apparatuses, and non-transitory computer-readable medium described herein, the configuration includes a set of combinations for the subcarrier spacing and the number of DMRS occurrences.

In some examples of the method, apparatuses, and non-transitory computer-readable medium described herein, the configuration includes a first parameter for the subcarrier spacing and a second parameter for the number of DMRS occurrences.

In some examples of the method, apparatuses, and non-transitory computer-readable medium described herein, the subcarrier spacing and the number of DMRS occurrences may be based on the speed of the first wireless device exceeding a threshold.

Some examples of the method, apparatuses, and non-transitory computer-readable medium described herein may further include operations, features, means, or instructions for receiving an indication of the selected subcarrier spacing and the number of DMRS occurrences.

In some examples of the method, apparatuses, and non-transitory computer-readable medium described herein, the indication may be received in a PUSCH of the first random access message.

In some examples of the method, apparatuses, and non-transitory computer-readable medium described herein, the indication may be received in uplink control information on a physical uplink control channel.

In some examples of the method, apparatuses, and non-transitory computer-readable medium described herein, the indication includes a first parameter for the selected subcarrier spacing and a second parameter for the number of DMRS occurrences.

In some examples of the method, apparatuses, and non-transitory computer-readable medium described herein, the indication includes a configuration identification indicating the subcarrier spacing and the number of DMRS occurrences.

In some examples of the method, apparatuses, and non-transitory computer-readable medium described herein, the indication includes sequences, frequency position information, or both, for DMRS corresponding to the number of DMRS occurrences.

In some examples of the method, apparatuses, and non-transitory computer-readable medium described herein, the configuration may be transmitted in a system information message.

In some examples of the method, apparatuses, and non-transitory computer-readable medium described herein, the first wireless device may be a UE or a relay node.

DETAILED DESCRIPTION

Figure 1:
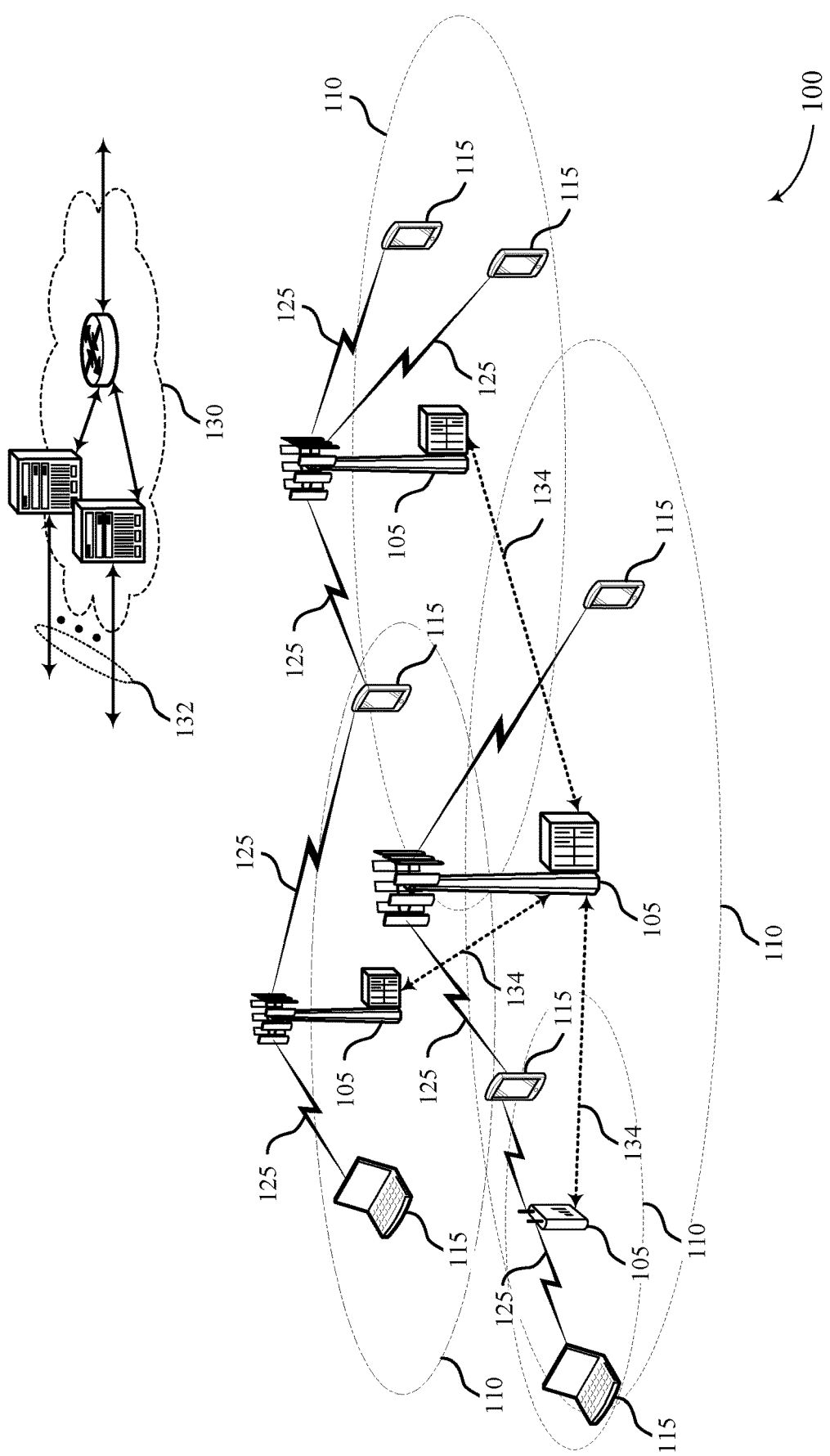
FIG. 1 illustrates an example of a system for wireless communications that supports two-step random access channel configuration in accordance with aspects of the present disclosure.

Some wireless communications systems may support a two-step random access channel procedure and communications with devices traveling at high speeds. For the two-step random access channel procedure, a user equipment (UE) may transmit a first random access message to a base station and receive a second random access response. Upon receiving the random access response, the random access channel procedure is complete, and the UE has a Radio Resource Control (RRC) connection established with the base station. The two-step random access channel procedure may establish an RRC connection between the UE and the base station with less signaling and in a shorter amount of time than some other random access channel procedures, especially in contention-based radio frequency spectrum bands, as the devices may first perform a clear channel assessments (CCA) to gain control of the contention-based resources. To provide these advantages over other random access procedures, the two-step random access channel procedure may be robust to interference and other issues. However, some configurations for two-step random access channel procedures may only support a single demodulation reference signal (DMRS) occurrence for the first random access message. In some high speed scenarios, a single DMRS may not provide a sufficiently robust first random access message for reliable two-step random access channel procedures.

Therefore, wireless communications systems described herein may support configurations for the first random access message which may use additional DMRS occurrences and larger subcarrier spacing. A base station may transmit a configuration for the first random access message of a two-step random access channel procedure to a UE. The configuration may include indicators of, or possible values for, a subcarrier spacing and a number of DMRS occurrences for the first random access message of the two-step random access channel procedure. In a first example, the configuration may include combinations of subcarrier spacings and DMRS occurrences. In a second example, the configuration may include two separate parameters for the subcarrier spacing and number of DMRS.

The UE may select a subcarrier spacing and a number of DMRS occurrences for the first random access message based on the configuration. In a first example, the UE may select a subcarrier spacing and number of DMRS occurrences based on a speed of the UE. For example, there may be different speed thresholds which correspond to different configurations or subcarrier spacings and DMRS occurrence quantities. If the UE detects itself moving faster than a speed threshold, the UE may select the corresponding configuration or a corresponding subcarrier spacing and a corresponding number of DMRS occurrences. In some examples, some cells may only support or configure the high speed configurations. For example, a cell may only support configurations which are used in high speed situations.

Once the UE selects the subcarrier spacing and number of DMRS occurrences, the UE may generate the first random access message for the two-step random access channel procedure. In some cases, the UE may indicate the selected subcarrier spacing and number of DMRS occurrences to the base station. Blind detection of the subcarrier spacing and number of DMRS occurrences may increase complexity at the receiver. Therefore, in some cases, the UE may transmit an indication to reduce complexity at the receiver. In some cases, the indication may be transmitted (e.g., via piggybacking) on a physical uplink shared channel (PUSCH).

Aspects of the disclosure are initially described in the context of a wireless communications system. Aspects of the disclosure are further illustrated by and described with reference to apparatus diagrams, system diagrams, and flowcharts that relate to two-step random access channel configuration.

FIG. 1 illustrates an example of a wireless communications system 100 that supports two-step random access channel configuration in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 may support a two-step random access channel procedure and communications with devices traveling at high speeds. In some cases, a UE 115 and a base station 105, or other wireless devices described herein such as relay devices or relay nodes, may support two-step random access channel procedures which use additional DMRS occurrences and larger subcarrier spacing for the first random access message when transmitting the first random access message in a high speed scenario. A base station 105 may transmit a configuration for the first random access message of a two-step random access channel procedure to a UE 115. The configuration may include indicators of, or possible values for, a subcarrier spacing and a number of DMRS occurrences for the first random access message of the two-step random access channel procedure.

The UE 115 may select a subcarrier spacing and a number of DMRS occurrences for the first random access message based on the configuration. In a first example, the UE 115 may select a subcarrier spacing and number of DMRS occurrences based on a speed of the UE 115. For example, there may be different speed thresholds which correspond to different configurations or subcarrier spacings and DMRS occurrence quantities. In some examples, some cells may only support or configure the high speed configurations. For example, a cell may only support configurations which are used in high speed situations. In some cases, the UE 115 may indicate the selected subcarrier spacing and number of DMRS occurrences to the base station 105. In some cases, the indication may be transmitted (e.g., via piggybacking) on an uplink shared channel.

Figure 2:
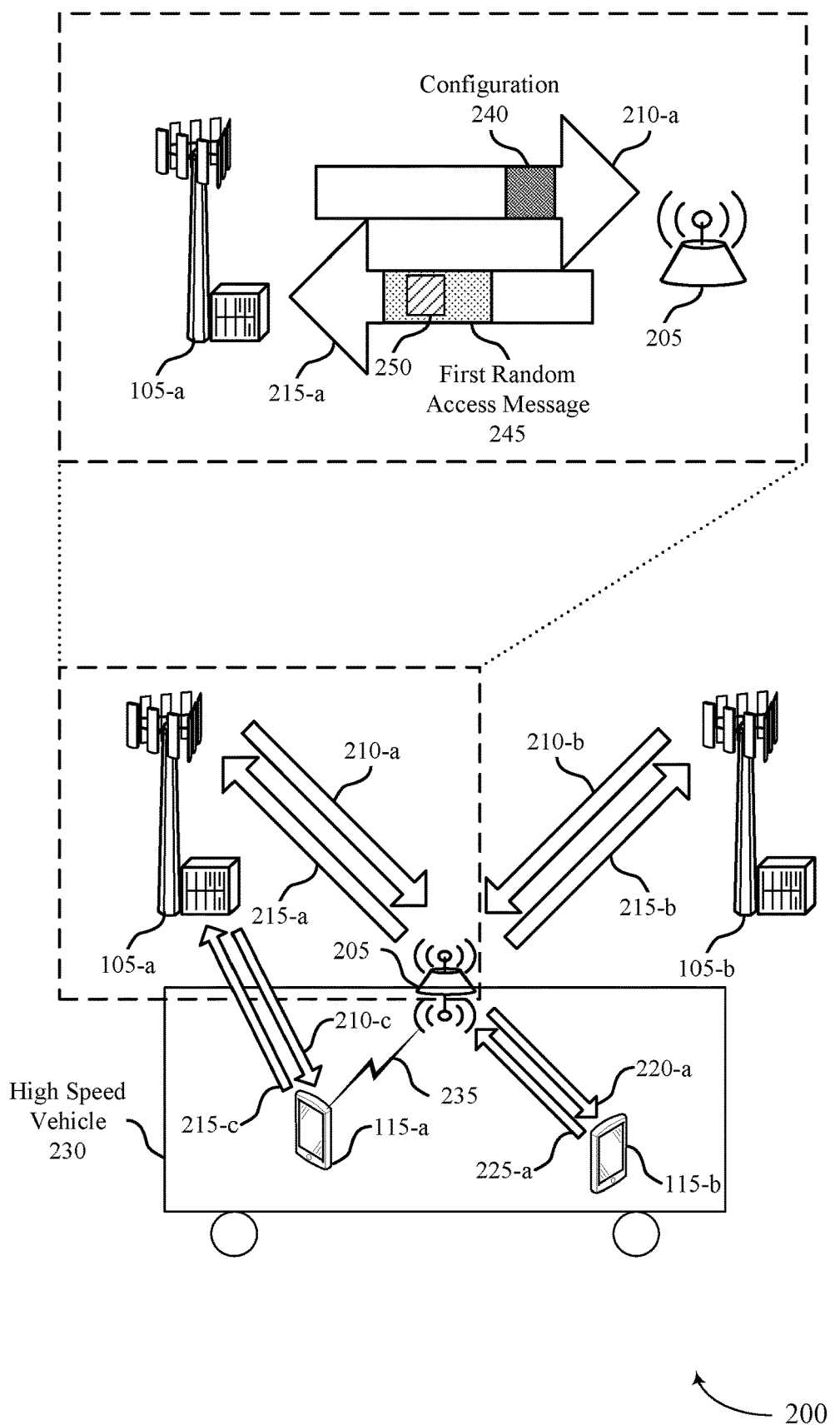
FIG. 2 illustrates an example of a wireless communications system that supports two-step random access channel configuration in accordance with aspects of the present disclosure.

FIG. 2 illustrates an example of a wireless communications system 200 that supports two-step random access channel configuration in accordance with aspects of the present disclosure. In some examples, the wireless communications system 200 may implement aspects of wireless communication system 100. The wireless communications systems 200 may include base station 105-a and base station 105-b, which may each be an example of a base station 105 as described herein. The wireless communications systems 200 may also include UE 115-a and UE 115-b, which may each be an example of a UE 115 as described herein.

The wireless communications systems 200 may be an example of a wireless communications system which supports high-speed vehicles or high-speed devices. For example, UE 115-a and UE 115-b may be traveling on a high speed vehicle 230. In other examples, UE 115-a and UE 115-b may be traveling at high speeds based on other situations. In some cases, the high speed vehicle 230 may include a relay device 205. In some examples, the relay device 205 may be an example of or include aspects of a UE 115. For example, the relay device 205 may behave as a UE 115 when communicating with the base stations 105. The relay device 205 may, in some cases, behave as a base station 105 when communicating with the UEs 115. For example, the relay device 205 may receive information for one or more UEs 115 on the high speed vehicle from a base station 105. The relay device 205 may then transmit (e.g., relay) that received information to the corresponding UEs 115. In some examples, the relay device 205 may be an example of a node of an integrated access and backhaul network (IAB), such as an IAB relay node.

In some examples, a UE 115 may have direct communication with a base station 105. For example, UE 115-a may receive downlink transmissions from base station 105-a on downlink carrier 210-c and transmit uplink transmissions to base station 105-a on uplink carrier 215-c. Or, in some cases, UE 115-a may communicate with base station 105-a through the relay device 205 via communication link 235. In some cases, a UE 115 described herein may support both direct communication with a base station 105 and communication with the base station 105 via the relay device 205.

The base stations 105 may each transmit to the relay device 205 on a downlink carrier 210, and the relay device 205 may transmit to each of the base stations 105 on an uplink carrier 215. For example, the relay device 205 may receive downlink transmissions from base station 105-a on downlink carrier 210-a and transmit uplink transmissions to base station 105-a on uplink carrier 215-a.

The relay device 205 may transmit to UEs 115 on a downlink carrier 220, and UEs 115 may transmit to the relay device 205 on an uplink carrier 225. For example, UE 115-b may transmit to the relay device 205 on uplink carrier 225-a, and the relay device 205 may transmit to UE 115-b on downlink carrier 220-a. In some case, a communication link 260 between the relay device 205 and a UE 115 may also include uplink and downlink carriers.

The wireless communications systems 200 may support a two-step random access channel procedure. For example, instead of a four-step random access procedure, a UE 115 may transmit a first random access message (e.g., Message A or MsgA) and receive a second random access message (e.g., Message B or a random access response). The first random access message may include a preamble and an uplink shared channel transmission (e.g., a physical uplink shared channel (PUSCH) transmission).

Upon receiving the second random access message, the two-step random access channel procedure may be complete, and the UE 115 may have an RRC connection established with the base station 105. In comparison, for other random access channel procedures (e.g., four step random access channel procedures), the UE 115 may transmit a random access preamble, receive a random access response, transmit an RRC connection request, then receive an RRC connection setup. The two-step random access channel procedure may therefore establish an RRC connection between the UE 115 and the base station 105 with less signaling and in a shorter amount of time. The two-step random access channel procedure may, in some cases, lead to significant latency reduction in contention-based radio frequency spectrum bands, as devices performing the two-step random access channel procedure may perform fewer clear channel assessments (CCAs) to gain control of the contention-based resources.

To provide these advantages over a four-step random access procedure, the two-step random access channel procedure may be robust to interference and other issues. For example, the PUSCH transmission of the first random access message may be more robust than the third random access message (e.g., a PUSCH or RRC connection request) of the four step random access channel procedure. In some cases, wireless devices performing a four step random access channel procedure may exchange or determine some timing or synchronization information via the first two random access messages of the four step random access channel procedure (e.g., the random access preamble and random access response of the four step random access channel procedure).

Configurations for some two-step random access channel procedures may only support a single DMRS occurrence. For example, the PUSCH of the first random access message of the two-step random access channel procedure may only be configured with a single port DMRS. In some high speed scenarios, such as the UEs 115 and the relay device 205 on the high speed vehicle 230, a single DMRS may not provide a sufficiently robust first random access message for reliable two-step random access channel procedures. Without a sufficiently reliable and robust first random access message, some of the advantages of two-step random access channel procedures described above may be lost.

The wireless devices of the wireless communications system 200 may implement techniques to increase the robustness of the two-step random access channel procedure. For example, the wireless communications system 200 may support configurations for the first random access message (e.g., MsgA) which may use additional DMRS occurrences and larger PUSCH or DMRS subcarrier spacing. Generally, techniques for configuring a UE 115 (e.g., UE 115-a, UE 115-b, or the relay device 205) with the additional number of DMRS occurrences and SCS are described herein. Some techniques for the UE 115 to select the number of DMRS occurrences and SCS are described herein. Some techniques for the UE 115 to report the selected number of DMRS occurrences and SCS are also described herein. The additional DMRS may use the same or different sequences as the frontloaded or preloaded DMRS. The additional DMRS may also have, or use, the same or different frequency location as the frontloaded or preloaded DMRS.

In an example, a base station 105 may transmit a configuration 240 for the first random access message of a two-step random access channel procedure to a UE 115. The configuration 240 may include indicators of, or possible values for, a subcarrier spacing and a number of DMRS occurrences for the first random access message of the two-step random access channel procedure. In an example shown, base station 105-a may transmit the configuration 240 to the relay device 205.

The configuration 240 may be transmitted in a system information message. In some cases, the UE 115 may be pre-configured with information associated with the configuration 240, and the information may be stored in memory at the device. The configuration may be transmitted from the base station 105 to the UE 115 on demand or broadcasted. For example, the UE 115 may transmit a request for the system information message. The base station 105 may receive the request and transmit the configuration 240 in the system information message based on receiving the request. Or, in some cases, the configuration 240 may be broadcasted. For example, the base station 105 may periodically broadcast the configuration 240 in a system information message.

In a first example, the configuration 240 may include combinations of subcarrier spacings and DMRS occurrences. For example, the configuration 240 may include a set of possible combinations or configurations for the subcarrier spacing and DMRS. In the first example, the subcarrier spacing and number of DMRS may be jointly indicated or bundled together. For example, a first configuration of the configuration 240 may include a 30 KHz subcarrier spacing and a single DMRS occurrence. The first configuration may, for example, not include any additional DMRS occurrences, just a frontloaded or preloaded DMRS. A second configuration may include a 60 KHz subcarrier spacing and a single DMRS occurrence. The second configuration may use a larger subcarrier spacing without any additional DMRS occurrences. A third configuration may include a 60 kHz subcarrier spacing and two DMRS occurrences. For example, the third configuration may include a preloaded DMRS occurrence and one additional DMRS occurrence. A fourth configuration may include a 60 kHz subcarrier spacing and three DMRS occurrences, corresponding to one preloaded DMRS and two additional DMRS.

In a second example, the configuration 240 may include two separate parameters for the subcarrier spacing and number of DMRS. For example, a first parameter of the configuration 240 may indicate a subcarrier spacing for the first random access message, and a second parameter of the configuration 240 may indicate a number of DMRS occurrences. In some cases, the configuration 240 may indicate a range of subcarrier spacings or multiple different subcarrier spacings and a range of DMRS occurrences or multiple different numbers of DMRS occurrences. In the second example, the subcarrier spacing and the number of DMRS may be individually or separately indicated.

The UE 115 may select a subcarrier spacing and a number of DMRS for the first random access message based on the configuration 240. In a first example, the UE 115 may select a subcarrier spacing and number of DMRS occurrences based on a speed of the UE 115. For example, there may be different speed thresholds which correspond to different configurations or subcarrier spacings and DMRS occurrence quantities. If the UE 115 detects itself moving faster than a speed threshold, the UE 115 may select the corresponding configuration (e.g., as described by the first example above) or a corresponding subcarrier spacing and a corresponding number of DMRS occurrences (e.g., as described by the second example above).

For example, the high speed vehicle, and therefore the relay device 205 and UEs 115, may travel at a speed which is below a first threshold. For the first configuration example, the UE 115 may detect its speed and select a subcarrier spacing and number of DMRS based on the first configuration. For example, at low speeds, the UE 115 may use the first configuration with no additional DMRS and a low subcarrier spacing. If the UE 115 travels at a speed which is above the first threshold and below a second threshold, the UE 115 may use the second configuration as described above. If the UE 115 travels at a speed above the second threshold but below a third threshold, the UE 115 may use the third configuration. Or, if the UE 115 travels at a speed which exceeds the third threshold, the UE 115 may use the fourth configuration. In some cases, the higher the speed of the UE 115, the higher the subcarrier spacing, the higher the number of DMRS occurrences, or both. As the speed of the UE 115 changes, the UE 115 may detect the change in speed and select a different configuration based on the new speed of the UE 115.

The UE 115 may similarly individually select a subcarrier spacing and a number of DMRS occurrences based on the speed of the UE 115. For example, below the first threshold, the UE 115 may use a subcarrier spacing of 15, 30, or 60 but only one DMRS occurrence (e.g., the frontloaded one). With a speed between the first threshold and the second threshold, the UE 115 may use either a subcarrier spacing of 30 kHz or 60 kHz. At this speed, the UE 115 may either use just the front loaded DMRS or, optionally, one additional DMRS. With a speed between the second threshold and the third threshold, the UE 115 may use either a subcarrier spacing of 30 KHz or 60 KHz. The UE 115 may use the frontloaded DMRS occasion as well as one or two additional DMRS. With a speed exceeding the third threshold, the UE 115 may use a subcarrier spacing of 60 KHz, the front loaded DMRS, and one or two additional DMRS. Therefore, the subcarrier spacing and number of DMRS occasions may increase with the speed of the UE.

In some examples, some cells may only support or configure the high speed configurations. For example, cells may be deployed to only serve high speed UEs (e.g., the relay device 205 on the high speed vehicle 230) with antenna and beam patterns which are configured to provide enhanced communications in high speed scenarios. For example, a cell may only support the third and fourth configurations, which may be used to increase robustness in high speed situations. Additionally, or alternatively, the cell may only support a high subcarrier spacing (e.g., 60 KHz instead of 15 KHz or 30 KHz) and use of additional DMRS occasions. If the UE 115 detects it is in a low speed mode (e.g., traveling at a low speed) and the high speed configurations are not suitable, the UE 115 may register or re-select to another cell configured for lower speeds.

For example, base station 105-*a* may provide a cell which is configured for high speed UEs 115, and base station 105-*b* may provide a cell which is configured for lower speed UEs 115. If the relay device 205 detects that it is traveling at a low speed which is not suitable for the high speed configurations of the cell of base station 105-*a*, the relay device 205 may reselect to or attach to the cell provided by base station 105-*b*. Similarly, if the UE 115 is attached to a cell configured for slow UE speeds, the UE 115 may reselect to a cell configured for high speed UEs if the speed of the UE 115 increases.

Once the UE 115 selects the subcarrier spacing and number of DMRS occurrences, the UE 115 may generate the first random access message for the two-step random access channel procedure. The UE 115 may generate the first random access message using the selected subcarrier spacing and using the selected number of additional DMRS. The UE 115 may then transmit the first random access message to the base station 105. For example, the relay device 205 may generate and transmit a first random access message 245 on uplink carrier 215-*a* to base station 105-*a*. In another example, UE 115-*a* may perform similar techniques to generate and transmit a first random access message on uplink carrier 215-*c* to base station 105-*a*. Or, in some cases, UE 115-*a* may generate and transmit the first random access message on the communication link 235 to the relay device 205.

The UE 115 may indicate the selected subcarrier spacing and number of DMRS occurrences to the base station 105. Blind detection of the subcarrier spacing and number of DMRS occurrences may increase complexity at the receiver. Therefore, in some cases, the UE 115 may transmit an indication 250 to reduce complexity at the receiver. The indication 250 may, for example, be an example of or be transmitted in uplink control information. The UE 115 may report the configuration along with PUSCH in uplink control information. In some cases, the uplink control information (e.g., the indication 250) may be transmitted together with the PUSCH (e.g., piggybacked on the PUSCH transmission), or the uplink control information may be transmitted separately. In some cases, the uplink control information may indicate the configuration number (e.g., corresponding to the first example above), or the uplink control information may indicate the specific subcarrier spacing and number of additional DMRS (e.g., corresponding to the second example above). If the additional DMRS use a different sequence than the frontloaded DMRS, the uplink control information may include an indication of the sequence (e.g., may include the exact sequence). If the additional DMRS uses a different frequency position than the frontloaded DMRS, the uplink control information may include frequency position information for the additional DMRS.

The first random access message 245, generated using additional DMRS, may be more reliable and robust for high speed scenarios. Thus, the receiving device (e.g., base station 105-*a* in the shown example) may have an increased likelihood of receiving and successfully decoding the first random access message 245. Base station 105-*a* may then transmit a second random access message (e.g., a random access response) to the relay device 205 to complete the two-step random access channel procedure.

Figure 3:
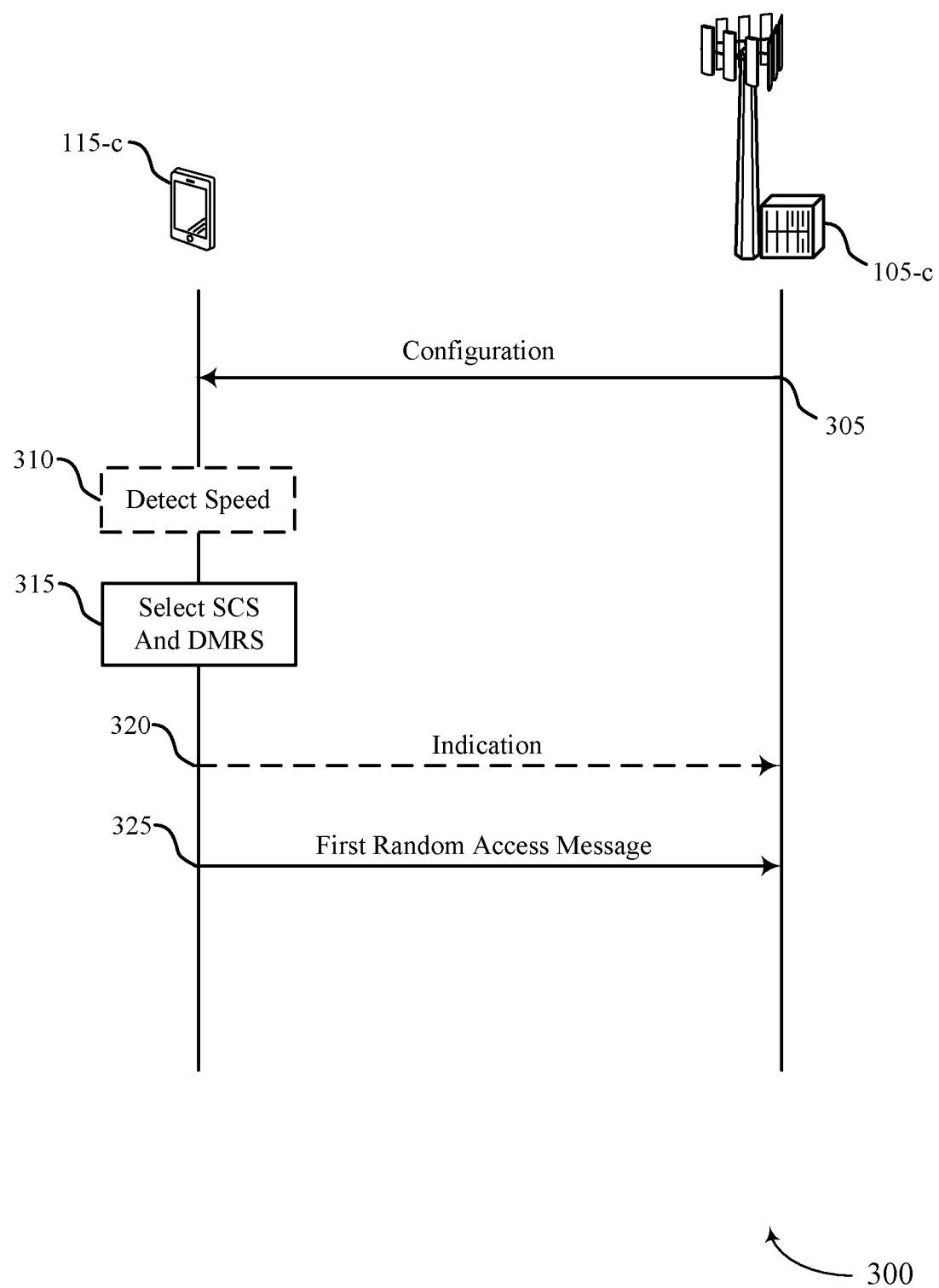
FIG. 3 illustrates an example of a process flow that supports two-step random access channel configuration in accordance with aspects of the present disclosure.

FIG. 3 illustrates an example of a process flow 300 that supports two-step random access channel configuration in accordance with aspects of the present disclosure. In some examples, process flow 300 may implement aspects of wireless communication system 100. The process flow 300 may include UE 115-*c* and base station 105-*c*. UE 115-*c* may be an example of a UE 115 as described herein or a relay device 205 as described with reference to FIG. 2. In some cases, UE 115-*c* may be referred to as a wireless device. Base station 105-*c* may be an example of a base station 105 as described herein or may also be an example of a relay device 205 as described with reference to FIG. 2.

At 305, base station 105-*c* may transmit a configuration for a first random access message of a two-step random access channel procedure to UE 115-*c*. In some cases, the configuration may include a set of combinations for a subcarrier spacing and a number of DMRS occurrences. For example, the subcarrier spacing and the number of DMRS occurrences may be bundled together into multiple different options or configurations. In some cases, the configuration may include a first parameter for the subcarrier spacing and a second parameter for the number of DMRS occurrences. For example, the subcarrier spacing and the number of DMRS occurrences may be independently or individually indicated.

In some cases, at 310, UE 115-*c* may detect its speed. For example, UE 115-*c* may be traveling at a high speed (e.g., on a high speed train or another high speed vehicle). At 315, UE 115-*c* may select a subcarrier spacing and a number of DMRS occurrences for transmitting the first random access message based on the configuration and a speed of UE 115-c. UE 115-c may select the subcarrier spacing and the number of DMRS occurrences based on the speed of the wireless device exceeding a threshold. For example, UE 115-c may be traveling at a speed which exceeds a threshold or falls between two thresholds as described with reference to FIG. 2. In some cases, UE 115-c may select a configuration identification corresponding to a combination of the set of combinations for the subcarrier spacing and the number of DMRS occurrences. Or, in some cases, UE 115-c may independently select the subcarrier spacing based on the first parameter and the number of DMRS occurrences based on the second parameter.

In some examples, UE 115-c may transmit an indication of the selected subcarrier spacing and the number of DMRS occurrences. In some examples, the indication may be transmitted in a PUSCH of the first random access message. For example, UE 115-c may transmit the indication in uplink control information which is piggybacked to a PUSCH of the first random access message. In some examples, UE 115-c may indicate which of the different sets of combinations was selected. Or, in some examples, UE 115-c may individually indicate values for the subcarrier spacing and the number of DMRS occurrences.

At 325, UE 115-c may transmit the first random access message of the two-step random access channel procedure using the subcarrier spacing and the number of DMRS occurrences. In some cases, the number of DMRS occurrences includes occurrences for a front loaded DMRS and at least one additional DMRS.

Figure 4:
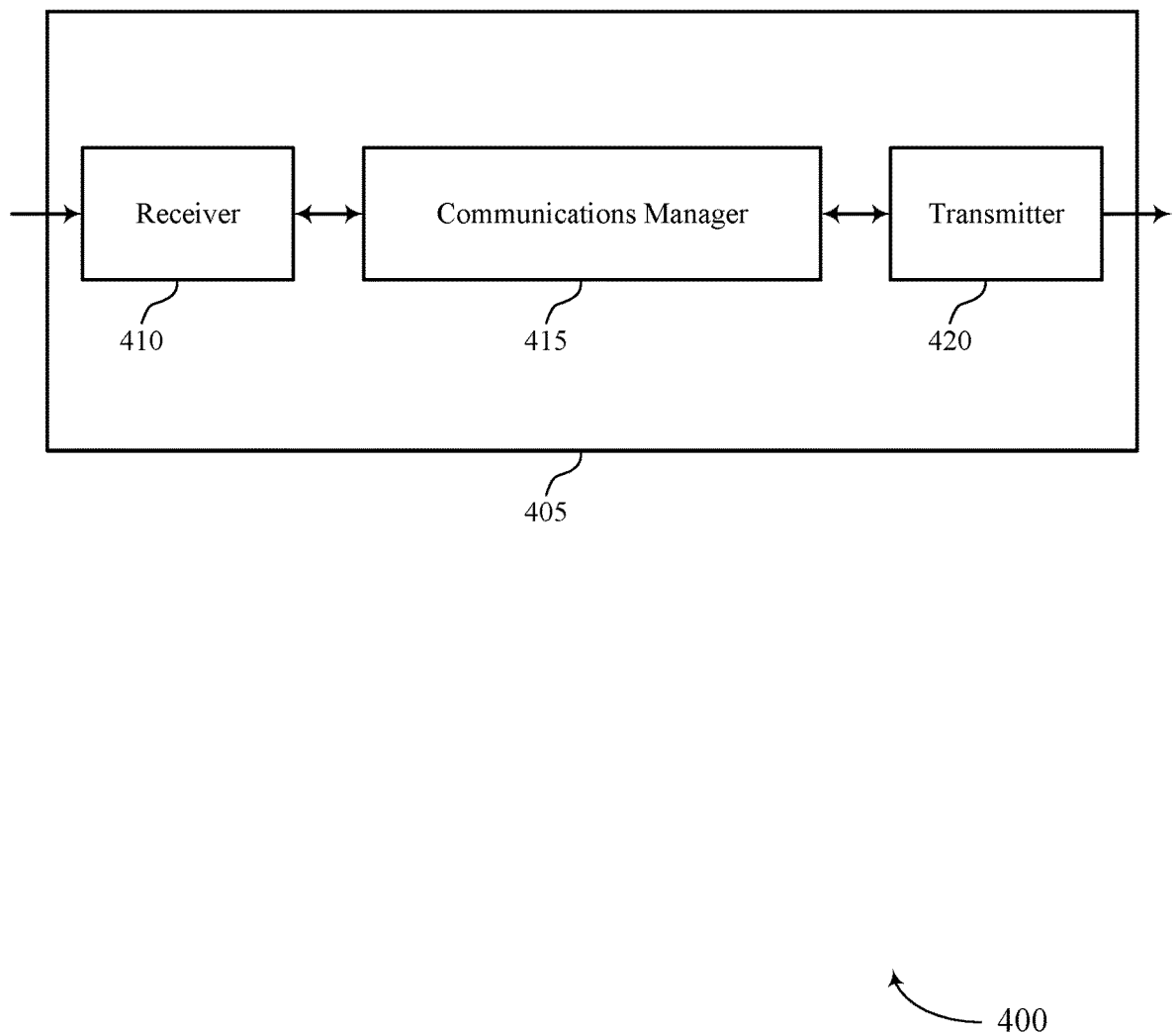
FIGS. 4 and 5 show block diagrams of devices that support two-step random access channel configuration in accordance with aspects of the present disclosure.

FIG. 4 shows a block diagram 400 of a device 405 that supports two-step random access channel configuration in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to two-step random access channel configuration, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a configuration for a first random access message of a two-step random access channel procedure, select a subcarrier spacing and a number of DMRS occurrences for transmitting the first random access message based on the configuration and a speed of the wireless device, and transmit the first random access message of the two-step random access channel procedure using the subcarrier spacing and the number of DMRS occurrences. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The actions performed by the UE communications manager 415 as described herein may be implemented to realize one or more potential advantages. One implementation may allow a UE 115 to reduce latency and increase reliability by avoiding having to retransmit a first random access message of a two-step random access channel procedure. Instead, the first random access message may be made more robust by implementing the techniques described herein, which may improve reliability and likelihood of a successful reception (e.g., at a receiving device) of the first random access message. These techniques may enable the UE 115 to actualize advantages of a two-step random access channel procedure over other random access channel procedures (e.g., four-step random access channel procedures) by providing timely RRC connection with fewer transmissions. This may correspond to the UE 115 performing fewer CCA procedures (e.g., LBT procedures), where each additional CCA procedure has a possibility that the UE 115 does not gain control of the transmission medium, further delaying the completion of the random access channel procedure. Where a PUSCH (e.g., a third message) of a four-step random access channel procedure may have some timing information or timing synchronization based on first and second messages, the techniques described herein may allow the two-step random access channel procedure to compensate for a lack of timing information by increasing robustness of the first random access message of the two-step random access channel procedure.

Figure 5:
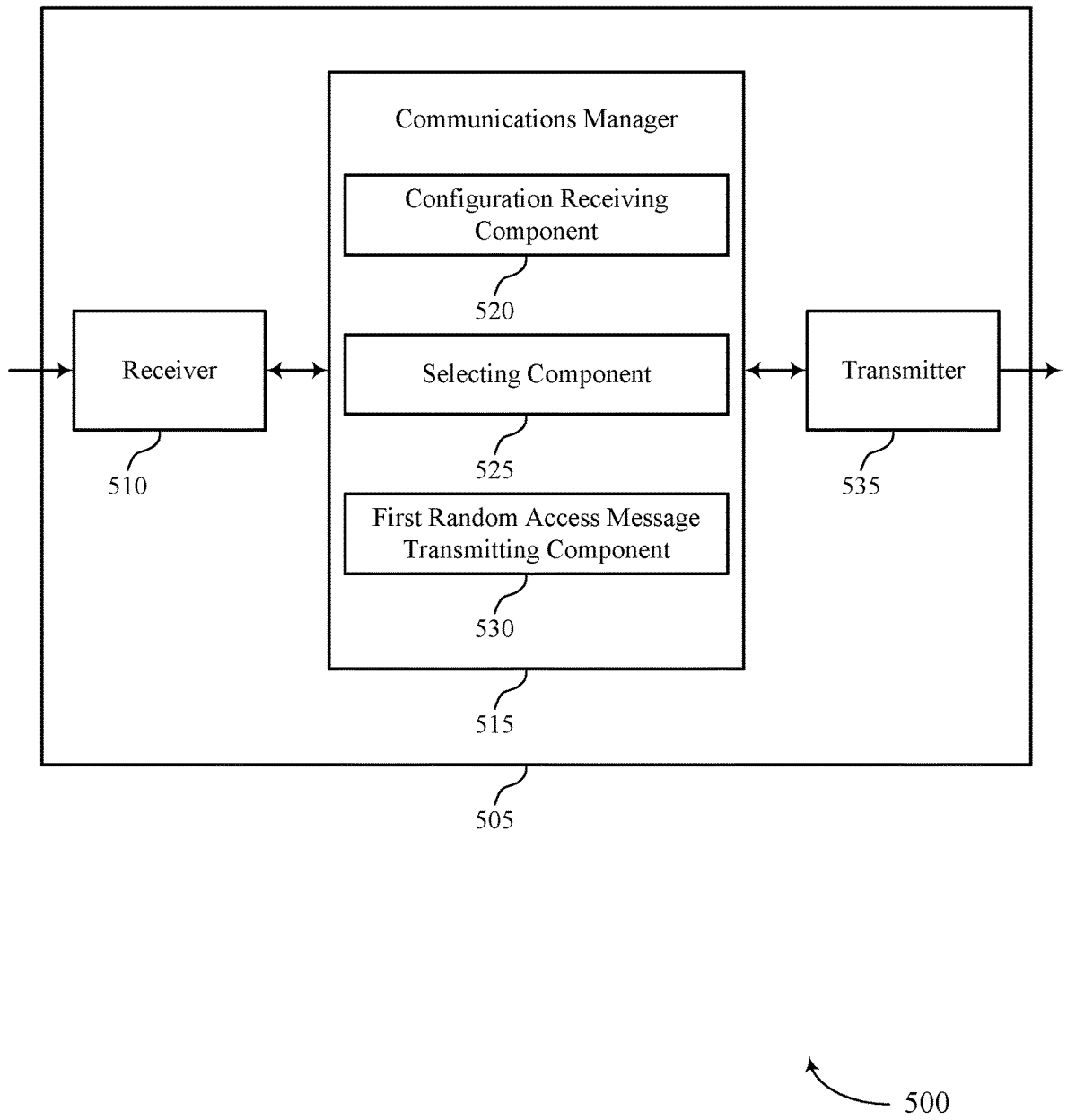

FIG. 5 shows a block diagram 500 of a device 505 that supports two-step random access channel configuration in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to two-step random access channel configuration, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a configuration receiving component 520, a selecting component 525, and a first random access message transmitting component 530. The communications manager 515 may be an example of aspects of the communications manager 710 described herein.

The configuration receiving component 520 may receive a configuration for a first random access message of a two-step random access channel procedure.

The selecting component 525 may select a subcarrier spacing and a number of DMRS occurrences for transmitting the first random access message based on the configuration and a speed of the wireless device.

The first random access message transmitting component 530 may transmit the first random access message of the two-step random access channel procedure using the subcarrier spacing and the number of DMRS occurrences.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Based on configuring a first random access message of a two-step random access channel procedure with additional DMRS occurrences, a processor of a UE 115 (e.g., controlling the receiver 510, the transmitter 535, or the transceiver 720 as described with reference to FIG. 7) may efficiently improve the robustness of the first random access message. By improving reliability of the first random access message, the processor may establish an RRC connection with a base station quicker, perform fewer CCA procedures, and generate fewer retransmissions of the first random access message. This may lead to the processor being able to go to a lower power state quicker or using less processing power to establish and RRC connection. Further, the processor of the UE 115 may transmit an indication of the selected number of additional DMRS occurrences and selected subcarrier spacing. This may assist the receiver (e.g., a base station 105) to determine which subcarrier spacing and how many DMRS occurrences were selected to generate the first random access message of the two-step random access channel procedure so that the receiver does not have to blindly detect these parameters. This may lead to improved performance at the receiving device as well.

Figure 6:
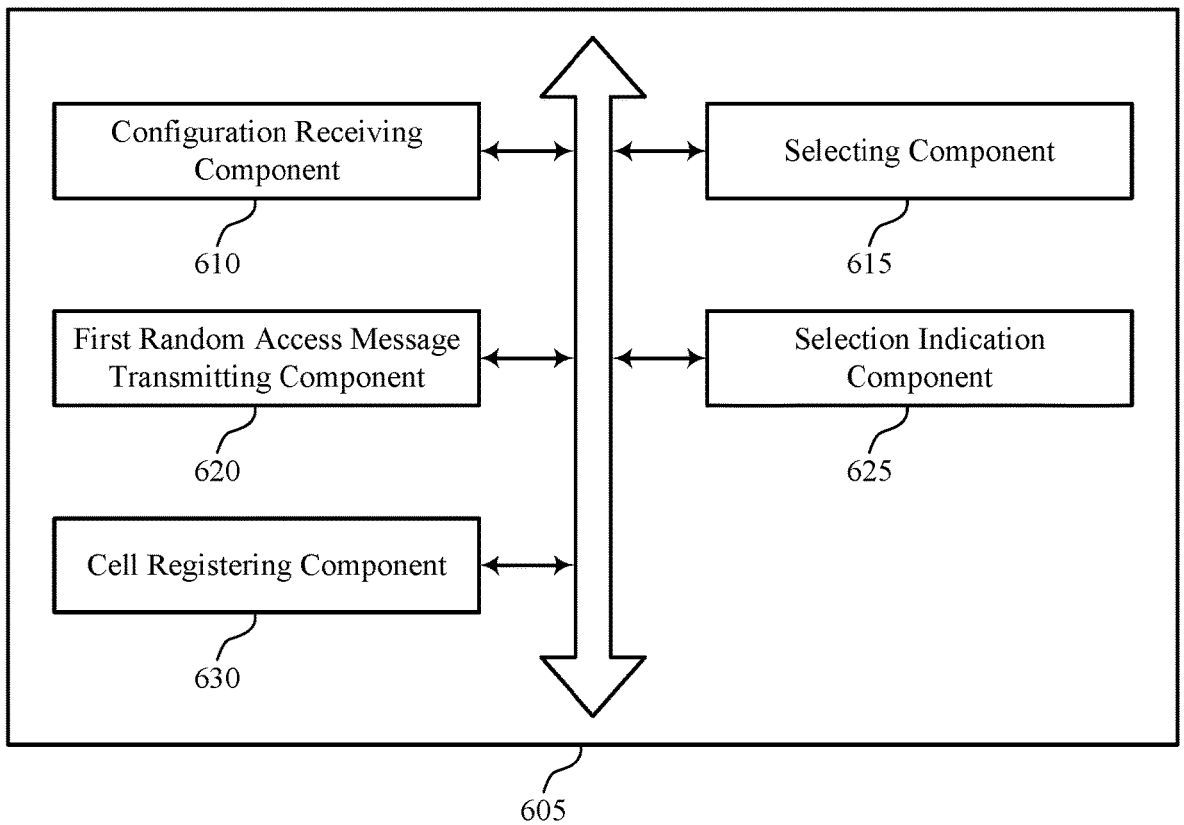
FIG. 6 shows a block diagram of a communications manager that supports two-step random access channel configuration in accordance with aspects of the present disclosure.

FIG. 6 shows a block diagram 600 of a communications manager 605 that supports two-step random access channel configuration in accordance with aspects of the present disclosure. The communications manager 605 may be an example of aspects of a communications manager 415, a communications manager 515, or a communications manager 710 described herein. The communications manager 605 may include a configuration receiving component 610, a selecting component 615, a first random access message transmitting component 620, a selection indication component 625, and a cell registering component 630. Each of these modules may communicate, directly or indirectly, with one another (e.g., via one or more buses).

The configuration receiving component 610 may receive a configuration for a first random access message of a two-step random access channel procedure. In some examples, the configuration receiving component 610 may transmit a request for the system information message, where the system information message is received based on the request. In some examples, the system information message is broadcasted. In some cases, the configuration includes a set of combinations for the subcarrier spacing and the number of DMRS occurrences. In some cases, the configuration includes a first parameter for the subcarrier spacing and a second parameter for the number of DMRS occurrences. In some cases, the configuration is received in a system information message.

In some cases, the number of DMRS occurrences includes occurrences for a front loaded DMRS and at least one additional DMRS. In some cases, the at least one additional DMRS uses a same sequence, frequency location, or both, as the front loaded DMRS. In some cases, the at least one additional DMRS uses a different sequence, frequency location, or both, than the front loaded DMRS. In some cases, the wireless device is a UE or a relay node.

The selecting component 615 may select a subcarrier spacing and a number of DMRS occurrences for transmitting the first random access message based on the configuration and a speed of the wireless device. In some examples, the selecting component 615 may select a configuration identification corresponding to a combination of the set of combinations for the subcarrier spacing and the number of DMRS occurrences.

In some examples, the selecting component 615 may independently select the subcarrier spacing based on the first parameter and the number of DMRS occurrences based on the second parameter. In some examples, the selecting component 615 may select the subcarrier spacing and the number of DMRS occurrences based on the speed of the wireless device exceeding a threshold.

The first random access message transmitting component 620 may transmit the first random access message of the two-step random access channel procedure using the subcarrier spacing and the number of DMRS occurrences.

The selection indication component 625 may transmit an indication of the selected subcarrier spacing and the number of DMRS occurrences. In some cases, the indication is included in a PUSCH of the first random access message. In some cases, the indication is transmitted in uplink control information on a physical uplink control channel. In some cases, the indication includes a first parameter for the selected subcarrier spacing and a second parameter for the number of DMRS occurrences.

In some cases, the indication includes a configuration identification to indicate the subcarrier spacing and the number of DMRS occurrences. In some cases, the indication includes sequences, frequency position information, or both, for DMRS corresponding to the number of DMRS occurrences.

The cell registering component 630 may determine the speed of the wireless device is below a threshold. In some examples, the cell registering component 630 may register to another cell based on the determining.

Figure 7:
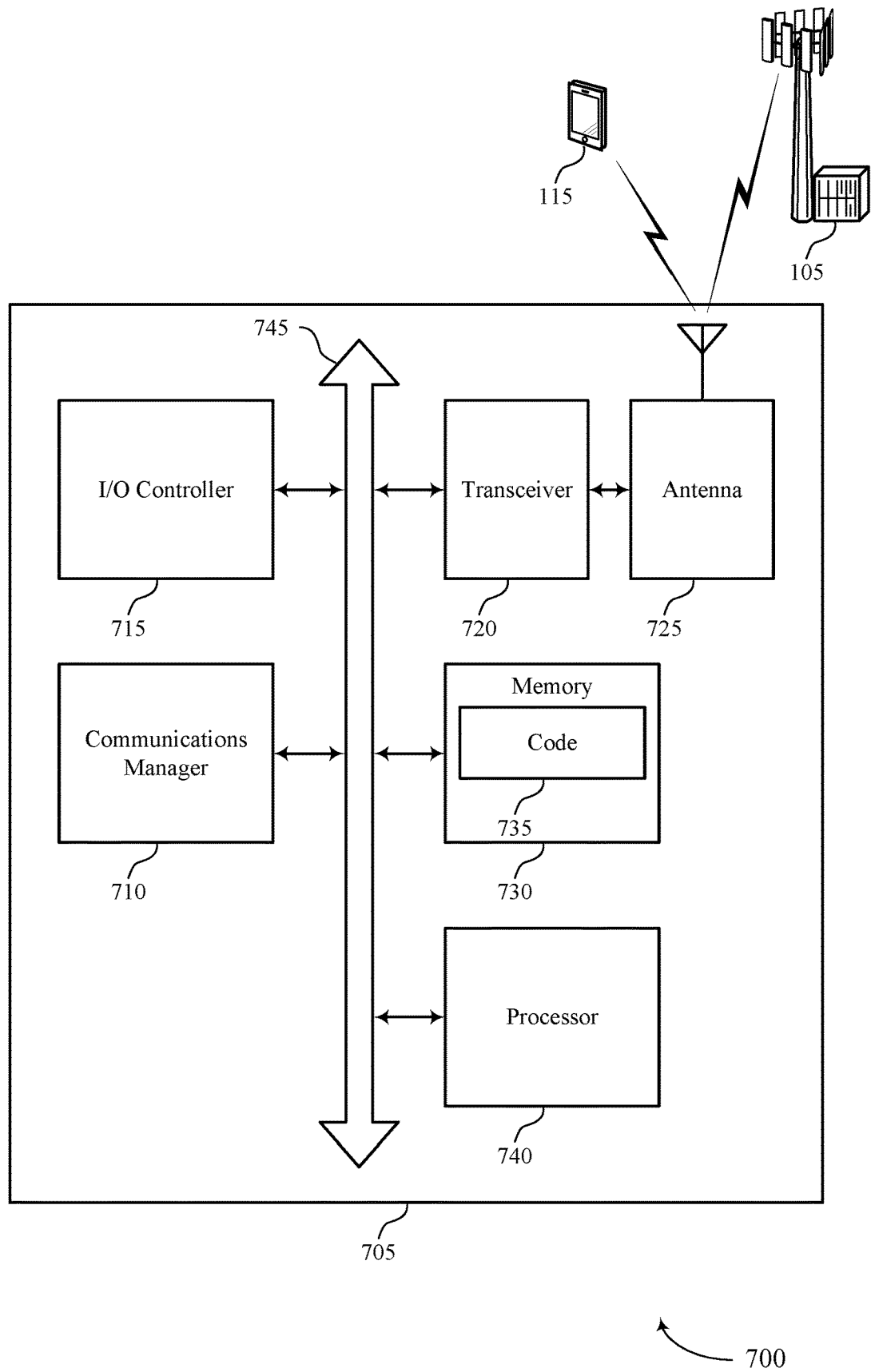
FIG. 7 shows a diagram of a system including a device that supports two-step random access channel configuration in accordance with aspects of the present disclosure.

FIG. 7 shows a diagram of a system 700 including a device 705 that supports two-step random access channel configuration in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a configuration for a first random access message of a two-step random access channel procedure, select a subcarrier spacing and a number of DMRS occurrences for transmitting the first random access message based on the configuration and a speed of the wireless device, and transmit the first random access message of the two-step random access channel procedure using the subcarrier spacing and the number of DMRS occurrences.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting two-step random access channel configuration).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
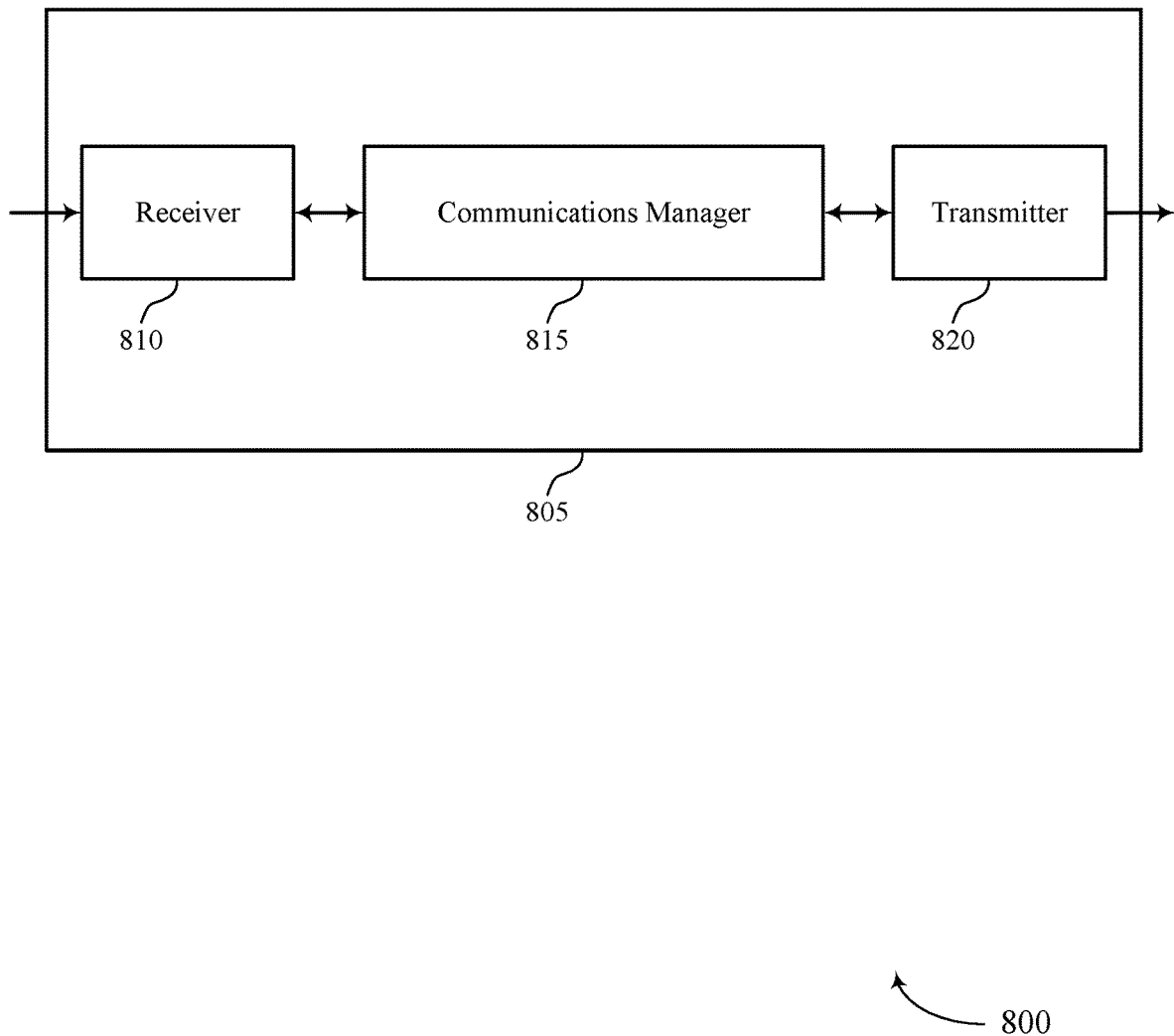
FIGS. 8 and 9 show block diagrams of devices that support two-step random access channel configuration in accordance with aspects of the present disclosure.

FIG. 8 shows a block diagram 800 of a device 805 that supports two-step random access channel configuration in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to two-step random access channel configuration, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a first wireless device, a configuration for a first random access message of a two-step random access channel procedure and receive the first random access message of the two-step random access channel procedure using a subcarrier spacing and a number of DMRS occurrences, where the subcarrier spacing and the number of DMRS occurrences are based on the configuration and a speed of the first wireless device. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
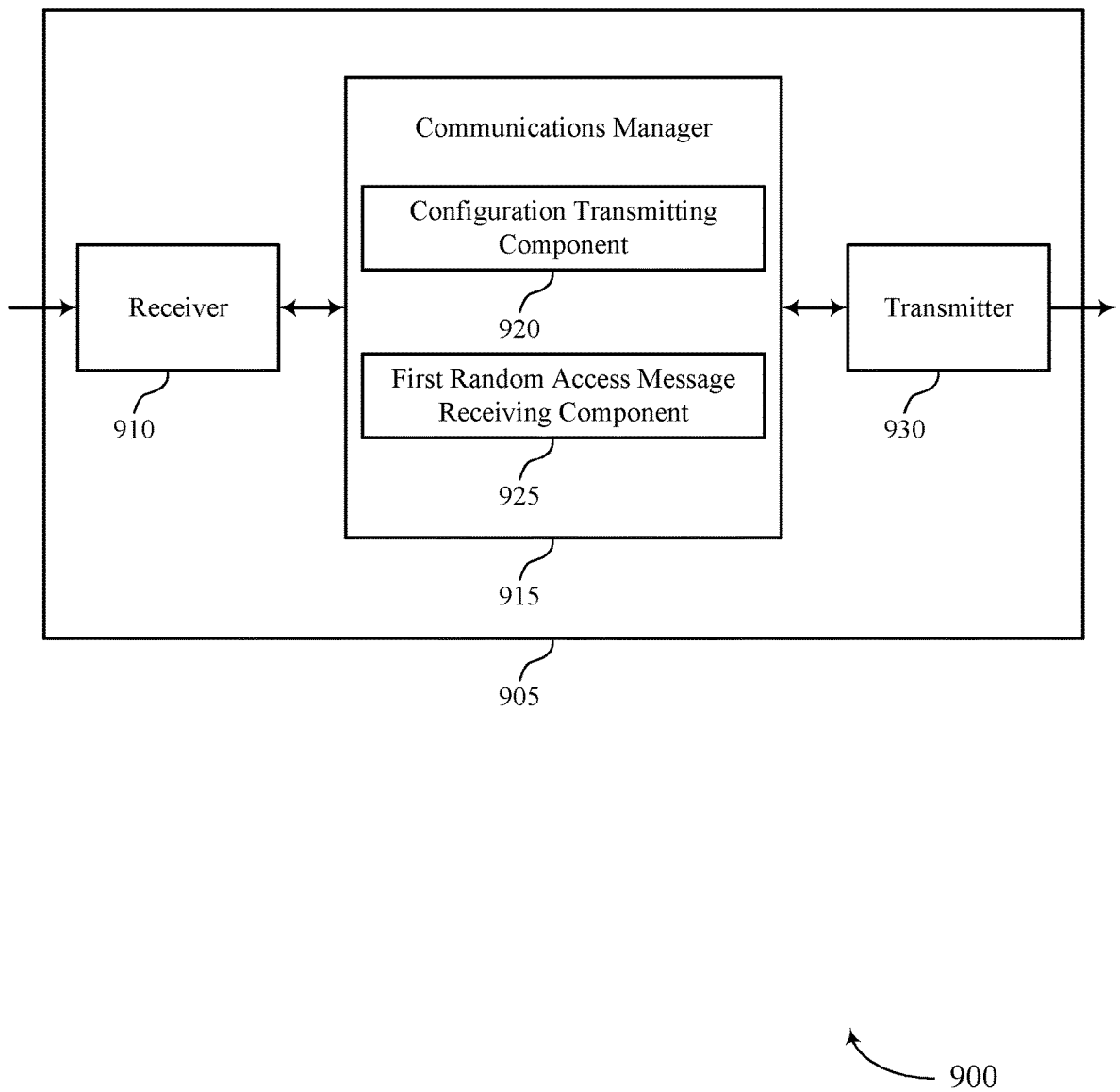

FIG. 9 shows a block diagram 900 of a device 905 that supports two-step random access channel configuration in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to two-step random access channel configuration, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration transmitting component 920 and a first random access message receiving component 925. The communications manager 915 may be an example of aspects of the communications manager 1110 described herein.

The configuration transmitting component 920 may transmit, to a first wireless device, a configuration for a first random access message of a two-step random access channel procedure.

The first random access message receiving component 925 may receive the first random access message of the two-step random access channel procedure using a subcarrier spacing and a number of DMRS occurrences, where the subcarrier spacing and the number of DMRS occurrences are based on the configuration and a speed of the first wireless device.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
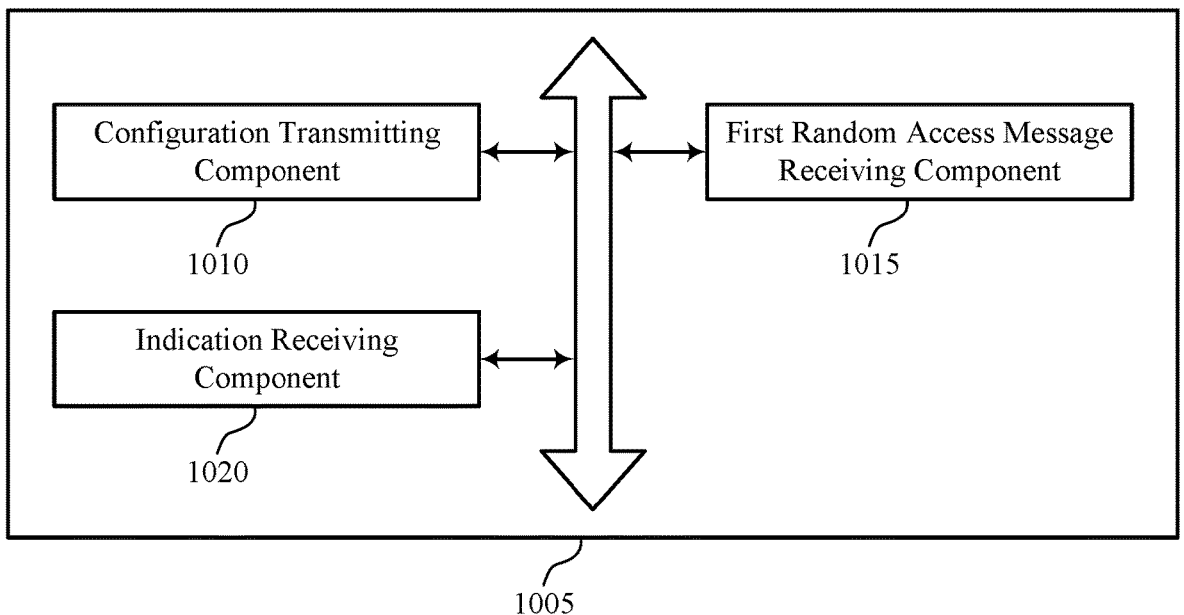
FIG. 10 shows a block diagram of a communications manager that supports two-step random access channel configuration in accordance with aspects of the present disclosure.

FIG. 10 shows a block diagram 1000 of a communications manager 1005 that supports two-step random access channel configuration in accordance with aspects of the present disclosure. The communications manager 1005 may be an example of aspects of a communications manager 815, a communications manager 915, or a communications manager 1110 described herein. The communications manager 1005 may include a configuration transmitting component 1010, a first random access message receiving component 1015, and an indication receiving component 1020. Each of these modules may communicate, directly or indirectly, with one another (e.g., via one or more buses).

The configuration transmitting component 1010 may transmit, to a first wireless device, a configuration for a first random access message of a two-step random access channel procedure. In some cases, the configuration includes a set of combinations for the subcarrier spacing and the number of DMRS occurrences. In some cases, the configuration includes a first parameter for the subcarrier spacing and a second parameter for the number of DMRS occurrences. In some cases, the configuration is transmitted in a system information message. In some cases, the first wireless device is a UE or a relay node.

The first random access message receiving component 1015 may receive the first random access message of the two-step random access channel procedure using a subcarrier spacing and a number of DMRS occurrences, where the subcarrier spacing and the number of DMRS occurrences are based on the configuration and a speed of the first wireless device. In some cases, the subcarrier spacing and the number of DMRS occurrences are based on the speed of the first wireless device exceeding a threshold.

The indication receiving component 1020 may receive an indication of the selected subcarrier spacing and the number of DMRS occurrences. In some cases, the indication is received in a PUSCH of the first random access message. In some cases, the indication is received in uplink control information on a physical uplink control channel.

In some cases, the indication includes a first parameter for the selected subcarrier spacing and a second parameter for the number of DMRS occurrences. In some cases, the indication includes a configuration identification indicating the subcarrier spacing and the number of DMRS occurrences. In some cases, the indication includes sequences, frequency position information, or both, for DMRS corresponding to the number of DMRS occurrences.

Figure 11:
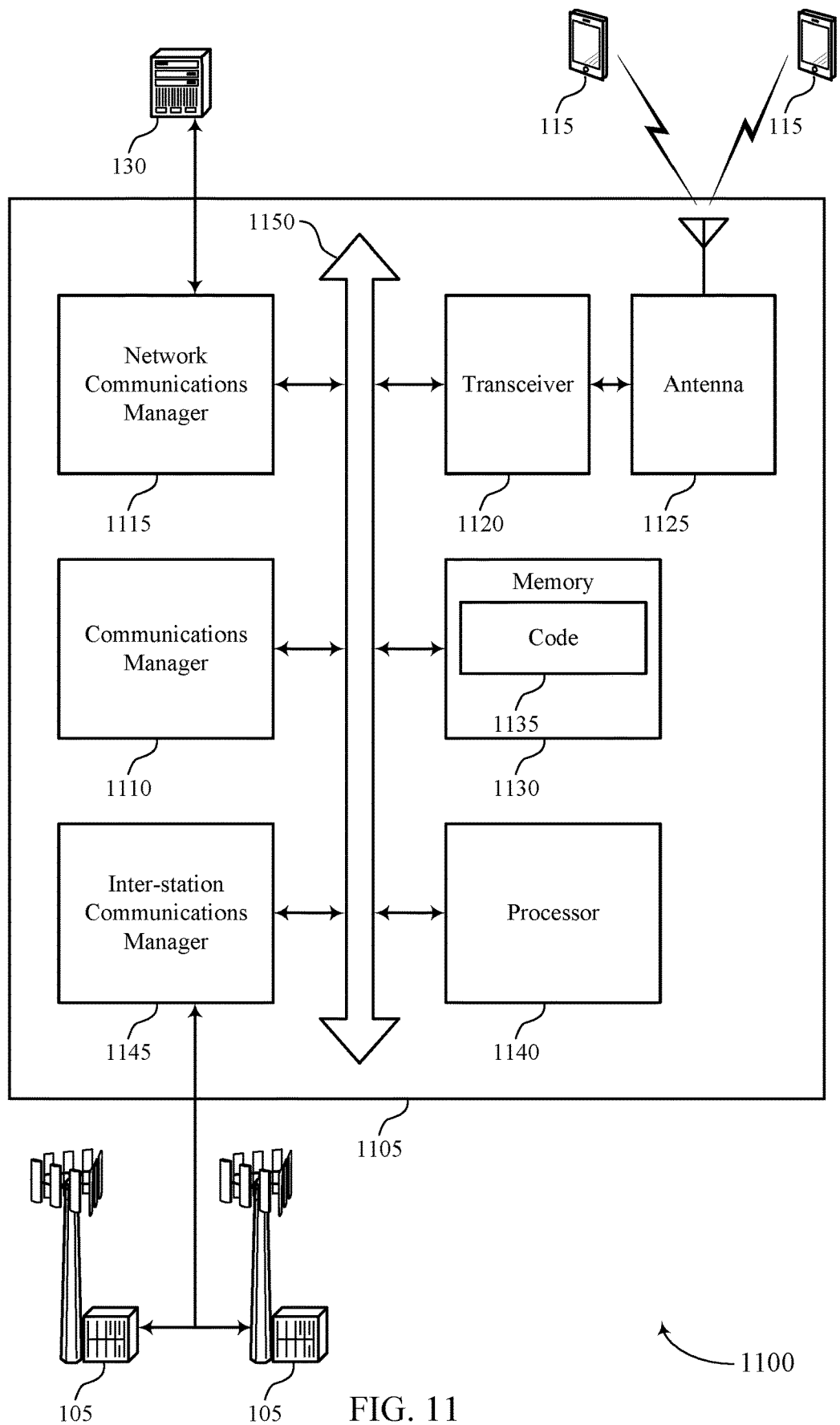
FIG. 11 shows a diagram of a system including a device that supports two-step random access channel configuration in accordance with aspects of the present disclosure.

FIG. 11 shows a diagram of a system 1100 including a device 1105 that supports two-step random access channel configuration in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a first wireless device, a configuration for a first random access message of a two-step random access channel procedure and receive the first random access message of the two-step random access channel procedure using a subcarrier spacing and a number of DMRS occurrences, where the subcarrier spacing and the number of DMRS occurrences are based on the configuration and a speed of the first wireless device.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting two-step random access channel configuration).

The inter-station communications manager 1145 may manage communications with other base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
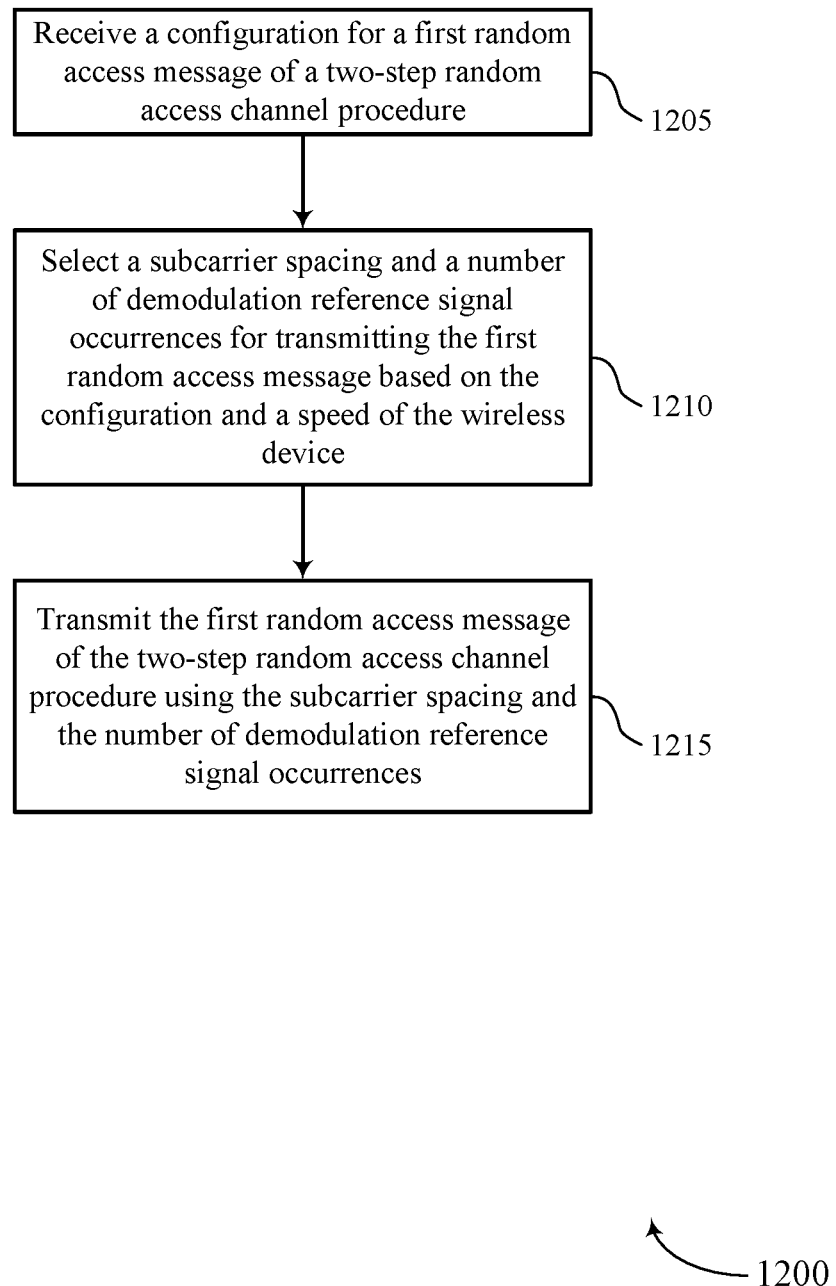
FIGS. 12 through 15 show flowcharts illustrating methods that support two-step random access channel configuration in accordance with aspects of the present disclosure.

FIG. 12 shows a flowchart illustrating a method 1200 that supports two-step random access channel configuration in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive a configuration for a first random access message of a two-step random access channel procedure. The operations of 1205 may be performed according to the methods described herein. In some examples, aspects of the operations of 1205 may be performed by a configuration receiving component as described with reference to FIGS. 4 through 7.

At 1210, the UE may select a subcarrier spacing and a number of DMRS occurrences for transmitting the first random access message based on the configuration and a speed of the wireless device. The operations of 1210 may be performed according to the methods described herein. In some examples, aspects of the operations of 1210 may be performed by a selecting component as described with reference to FIGS. 4 through 7.

At 1215, the UE may transmit the first random access message of the two-step random access channel procedure using the subcarrier spacing and the number of DMRS occurrences. The operations of 1215 may be performed according to the methods described herein. In some examples, aspects of the operations of 1215 may be performed by a first random access message transmitting component as described with reference to FIGS. 4 through 7.

Figure 13:
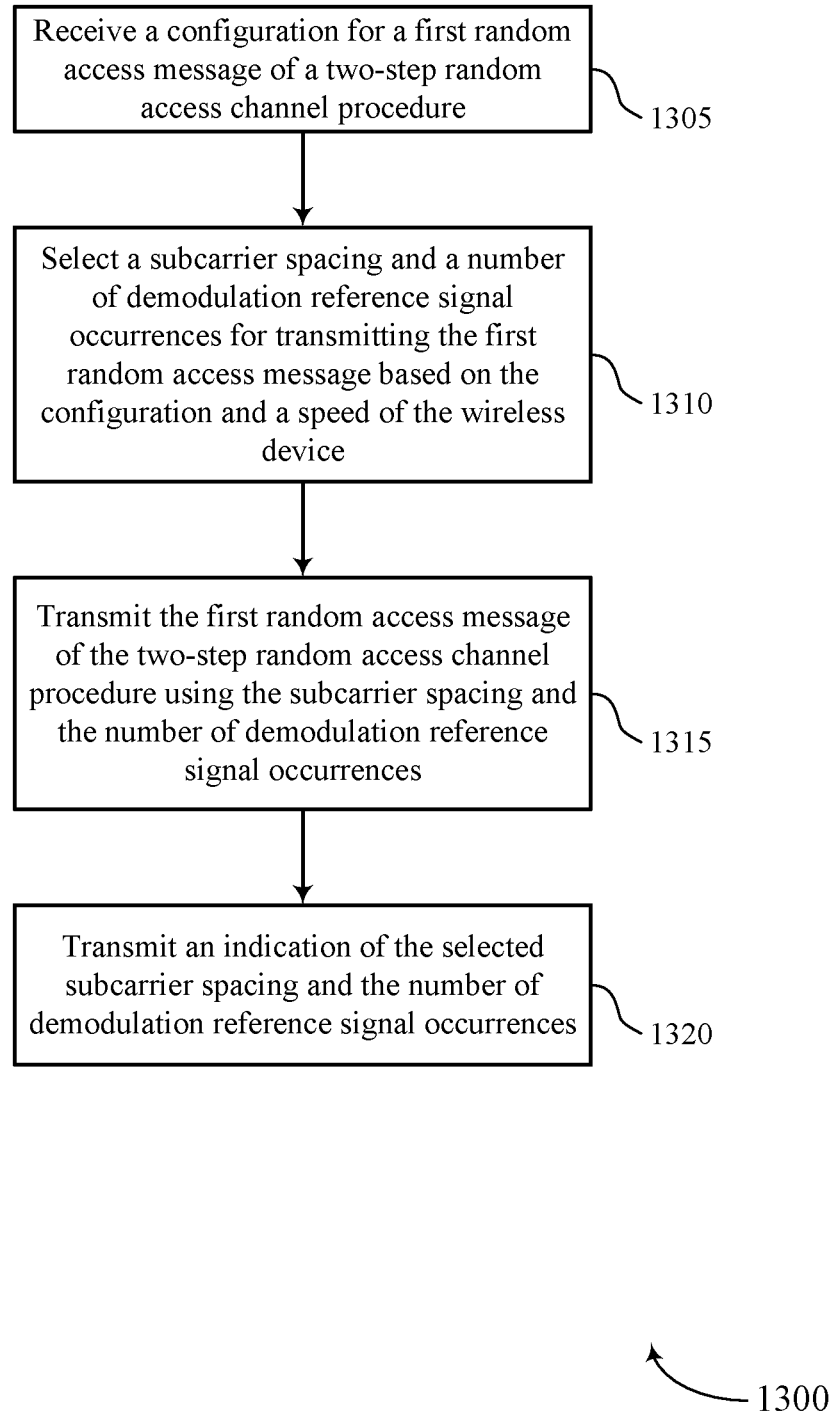

FIG. 13 shows a flowchart illustrating a method 1300 that supports two-step random access channel configuration in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive a configuration for a first random access message of a two-step random access channel procedure. The operations of 1305 may be performed according to the methods described herein. In some examples, aspects of the operations of 1305 may be performed by a configuration receiving component as described with reference to FIGS. 4 through 7.

At 1310, the UE may select a subcarrier spacing and a number of DMRS occurrences for transmitting the first random access message based on the configuration and a speed of the wireless device. The operations of 1310 may be performed according to the methods described herein. In some examples, aspects of the operations of 1310 may be performed by a selecting component as described with reference to FIGS. 4 through 7.

At 1315, the UE may transmit the first random access message of the two-step random access channel procedure using the subcarrier spacing and the number of DMRS occurrences. The operations of 1315 may be performed according to the methods described herein. In some examples, aspects of the operations of 1315 may be performed by a first random access message transmitting component as described with reference to FIGS. 4 through 7.

At 1320, the UE may transmit an indication of the selected subcarrier spacing and the number of DMRS occurrences. The operations of 1320 may be performed according to the methods described herein. In some examples, aspects of the operations of 1320 may be performed by a selection indication component as described with reference to FIGS. 4 through 7.

Figure 14:
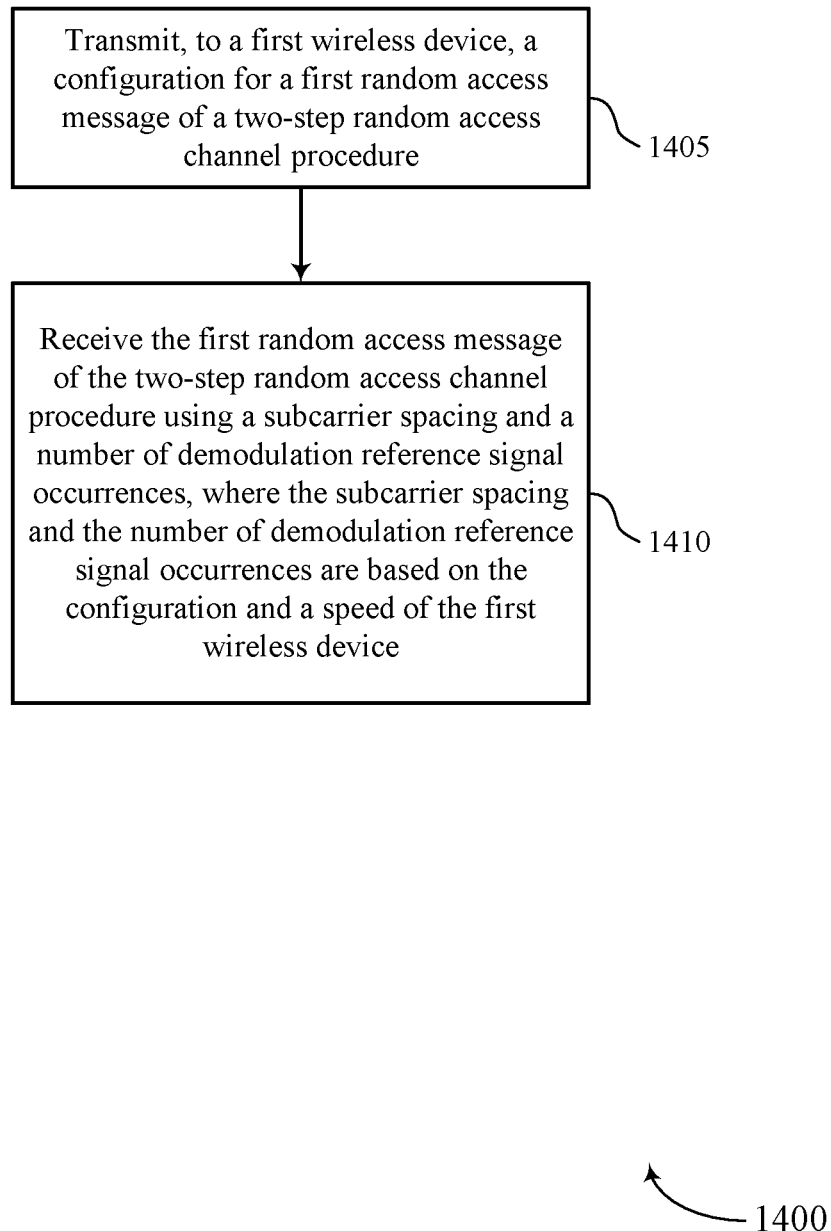

FIG. 14 shows a flowchart illustrating a method 1400 that supports two-step random access channel configuration in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may transmit, to a first wireless device, a configuration for a first random access message of a two-step random access channel procedure. The operations of 1405 may be performed according to the methods described herein. In some examples, aspects of the operations of 1405 may be performed by a configuration transmitting component as described with reference to FIGS. 8 through 11.

At 1410, the base station may receive the first random access message of the two-step random access channel procedure using a subcarrier spacing and a number of DMRS occurrences, where the subcarrier spacing and the number of DMRS occurrences are based on the configuration and a speed of the first wireless device. The operations of 1410 may be performed according to the methods described herein. In some examples, aspects of the operations of 1410 may be performed by a first random access message receiving component as described with reference to FIGS. 8 through 11.

Figure 15:
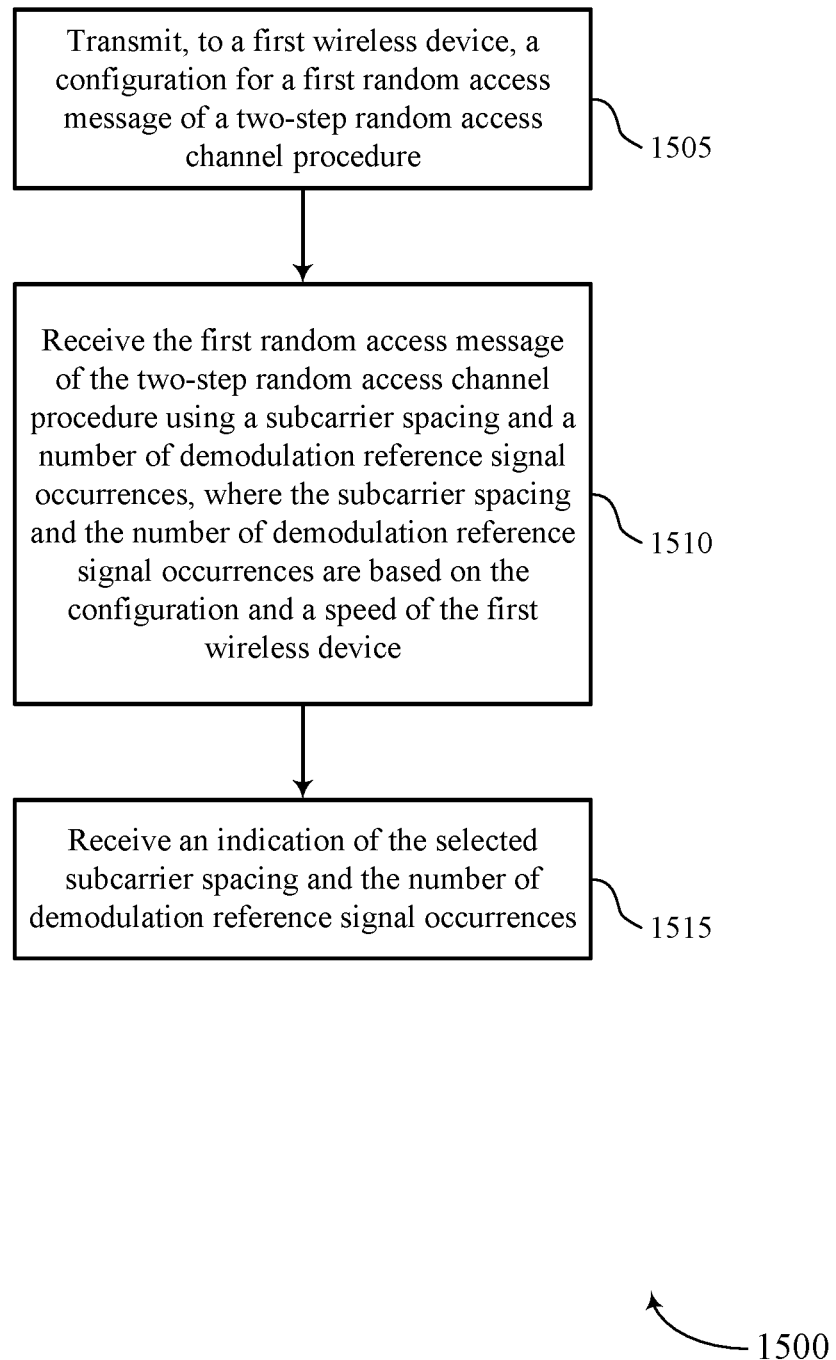

FIG. 15 shows a flowchart illustrating a method 1500 that supports two-step random access channel configuration in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may transmit, to a first wireless device, a configuration for a first random access message of a two-step random access channel procedure. The operations of 1505 may be performed according to the methods described herein. In some examples, aspects of the operations of 1505 may be performed by a configuration transmitting component as described with reference to FIGS. 8 through 11.

At 1510, the base station may receive the first random access message of the two-step random access channel procedure using a subcarrier spacing and a number of DMRS occurrences, where the subcarrier spacing and the number of DMRS occurrences are based on the configuration and a speed of the first wireless device. The operations of 1510 may be performed according to the methods described herein. In some examples, aspects of the operations of 1510 may be performed by a first random access message receiving component as described with reference to FIGS. 8 through 11.

At 1515, the base station may receive an indication of the selected subcarrier spacing and the number of DMRS occurrences. The operations of 1515 may be performed according to the methods described herein. In some examples, aspects of the operations of 1515 may be performed by an indication receiving component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Embodiment 1: A method for wireless communications at a wireless device, comprising: receiving a configuration for a first random access message of a two-step random access channel procedure; selecting a subcarrier spacing and a number of demodulation reference signal occurrences for transmitting the first random access message based at least in part on the configuration and a speed of the wireless device; and transmitting the first random access message of the two-step random access channel procedure using the subcarrier spacing and the number of demodulation reference signal occurrences.

Embodiment 2: The method of embodiment 1, wherein the configuration comprises a set of combinations for the subcarrier spacing and the number of demodulation reference signal occurrences.

Embodiment 3: The method of embodiment 2, wherein the selecting comprises: selecting a configuration identification corresponding to a combination of the set of combinations for the subcarrier spacing and the number of demodulation reference signal occurrences.

Embodiment 4: The method of any of embodiments 1 to 3, wherein the configuration comprises a first parameter for the subcarrier spacing and a second parameter for the number of demodulation reference signal occurrences.

Embodiment 5: The method of embodiment 4, wherein the selecting comprises: independently selecting the subcarrier spacing based at least in part on the first parameter and the number of demodulation reference signal occurrences based at least in part on the second parameter.

Embodiment 6: The method of any of embodiments 1 to 5, further comprising: selecting the subcarrier spacing and the number of demodulation reference signal occurrences based at least in part on the speed of the wireless device exceeding a threshold.

Embodiment 7: The method of any of embodiments 1 to 6, further comprising: transmitting an indication of the selected subcarrier spacing and the number of demodulation reference signal occurrences.

Embodiment 8: The method of embodiment 7, wherein the indication is included in a physical uplink shared channel (PUSCH) of the first random access message.

Embodiment 9: The method of embodiment 7, wherein the indication is transmitted in uplink control information on a physical uplink control channel.

Embodiment 10: The method of embodiment 7, wherein the indication comprises a first parameter for the selected subcarrier spacing and a second parameter for the number of demodulation reference signal occurrences.

Embodiment 11: The method of embodiment 7, wherein the indication comprises a configuration identification to indicate the subcarrier spacing and the number of demodulation reference signal occurrences.

Embodiment 12: The method of embodiment 7, wherein the indication comprises sequences, frequency position information, or both, for demodulation reference signals corresponding to the number of demodulation reference signal occurrences.

Embodiment 13: The method of any of embodiments 1 to 12, wherein the configuration is received in a system information message.

Embodiment 14: The method of embodiment 13, further comprising: transmitting a request for the system information message, wherein the system information message is received based at least in part on the request.

Embodiment 15: The method of any of embodiments 1 to 14, further comprising: determining the speed of the wireless device is below a threshold; and registering to another cell based at least in part on the determining.

Embodiment 16: The method of any of embodiments 1 to 15, wherein the number of demodulation reference signal occurrences comprises occurrences for a front loaded demodulation reference signal and at least one additional demodulation reference signal.

Embodiment 17: The method of embodiment 16, wherein the at least one additional demodulation reference signal uses a same sequence, frequency location, or both, as the front loaded demodulation reference signal.

Embodiment 18: The method of embodiment 16, wherein the at least one additional demodulation reference signal uses a different sequence, frequency location, or both, than the front loaded demodulation reference signal.

Embodiment 19: The method of any of embodiments 1 to 18, wherein the wireless device is a user equipment (UE) or a relay node.

Embodiment 20: A method for wireless communications, comprising: transmitting, to a first wireless device, a configuration for a first random access message of a two-step random access channel procedure; and receiving the first random access message of the two-step random access channel procedure using a subcarrier spacing and a number of demodulation reference signal occurrences, wherein the subcarrier spacing and the number of demodulation reference signal occurrences are based at least in part on the configuration and a speed of the first wireless device.

Embodiment 21: The method of embodiment 20, wherein the configuration comprises a set of combinations for the subcarrier spacing and the number of demodulation reference signal occurrences.

Embodiment 22: The method of any of embodiments 20 to 21, wherein the configuration comprises a first parameter for the subcarrier spacing and a second parameter for the number of demodulation reference signal occurrences.

Embodiment 23: The method of any of embodiments 20 to 22, wherein the subcarrier spacing and the number of demodulation reference signal occurrences are based at least in part on the speed of the first wireless device exceeding a threshold.

Embodiment 24: The method of any of embodiments 20 to 23, further comprising: receiving an indication of the selected subcarrier spacing and the number of demodulation reference signal occurrences.

Embodiment 25: The method of embodiment 24, wherein the indication is received in a physical uplink shared channel (PUSCH) of the first random access message.

Embodiment 26: The method of embodiment 24, wherein the indication is received in uplink control information on a physical uplink control channel.

Embodiment 27: The method of embodiment 24, wherein the indication comprises a first parameter for the selected subcarrier spacing and a second parameter for the number of demodulation reference signal occurrences.

Embodiment 28: The method of embodiment 24, wherein the indication comprises a configuration identification indicating the subcarrier spacing and the number of demodulation reference signal occurrences.

Embodiment 29: The method of embodiment 24, wherein the indication comprises sequences, frequency position information, or both, for demodulation reference signals corresponding to the number of demodulation reference signal occurrences.

Embodiment 30: The method of any of embodiments 20 to 29, wherein the configuration is transmitted in a system information message.

Embodiment 31: The method of any of embodiments 20 to 30, wherein the first wireless device is a user equipment (UE) or a relay node.

Embodiment 32: An apparatus comprising at least one means for performing a method of any of embodiments 1 to 19.

Embodiment 33: An apparatus comprising at least one means for performing a method of any of embodiments 20 to 31.

Embodiment 34: An apparatus for wireless communications comprising a processor; memory in electronic communication with the processor; and instructions stored in the memory and executable by the processor to cause the apparatus to perform a method of any of embodiments 1 to 19.

Embodiment 35: An apparatus for wireless communications comprising a processor; memory in electronic communication with the processor; and instructions stored in the memory and executable by the processor to cause the apparatus to perform a method of any of embodiments 20 to 31.

Embodiment 36: A non-transitory computer-readable medium storing code for wireless communications, the code comprising instructions executable by a processor to perform a method of any of embodiments 1 to 19.

Embodiment 37: A non-transitory computer-readable medium storing code for wireless communications, the code comprising instructions executable by a processor to perform a method of any of embodiments 21 to 31.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a wireless device, comprising:
receiving a configuration for a first random access message of a two-step random access channel procedure;
selecting a subcarrier spacing and a number of demodulation reference signal occurrences for transmitting the first random access message based at least in part on the configuration and a speed of the wireless device; and
transmitting the first random access message of the two-step random access channel procedure using the subcarrier spacing and the number of demodulation reference signal occurrences.

2. The method of claim 1, wherein the configuration comprises a set of combinations for the subcarrier spacing and the number of demodulation reference signal occurrences.

3. The method of claim 2, wherein the selecting comprises:
selecting a configuration identification corresponding to a combination of the set of combinations for the subcarrier spacing and the number of demodulation reference signal occurrences.

4. The method of claim 1, wherein the configuration comprises a first parameter for the subcarrier spacing and a second parameter for the number of demodulation reference signal occurrences.

5. The method of claim 4, wherein the selecting comprises:
independently selecting the subcarrier spacing based at least in part on the first parameter and the number of demodulation reference signal occurrences based at least in part on the second parameter.

6. The method of claim 1, further comprising:
selecting the subcarrier spacing and the number of demodulation reference signal occurrences based at least in part on the speed of the wireless device exceeding a threshold.

7. The method of claim 1, further comprising:
transmitting an indication of the selected subcarrier spacing and the number of demodulation reference signal occurrences.

8. The method of claim 7, wherein the indication is included in a physical uplink shared channel (PUSCH) of the first random access message, in uplink control information on a physical uplink control channel, or both.

9. The method of claim 7, wherein the indication comprises a first parameter for the selected subcarrier spacing and a second parameter for the number of demodulation reference signal occurrences.

10. The method of claim 7, wherein the indication comprises a configuration identification to indicate the subcarrier spacing and the number of demodulation reference signal occurrences.

11. The method of claim 7, wherein the indication comprises sequences, frequency position information, or both, for demodulation reference signals corresponding to the number of demodulation reference signal occurrences.

12. The method of claim 1, wherein the configuration is received in a system information message.

13. The method of claim 12, further comprising:
transmitting a request for the system information message, wherein the system information message is received based at least in part on the request.

14. The method of claim 1, further comprising:
determining the speed of the wireless device is below a threshold; and
registering to another cell based at least in part on the determining.

15. The method of claim 1, wherein the number of demodulation reference signal occurrences comprises occurrences for a front loaded demodulation reference signal and at least one additional demodulation reference signal.

16. The method of claim 15, wherein the at least one additional demodulation reference signal uses a same sequence, frequency location, or both, as the front loaded demodulation reference signal or a different sequence, frequency location, or both, than the front loaded demodulation reference signal.

17. The method of claim 1, wherein the wireless device is a user equipment (UE) or a relay node.

18. A method for wireless communications, comprising:
transmitting, to a first wireless device, a configuration for a first random access message of a two-step random access channel procedure; and
receiving the first random access message of the two-step random access channel procedure using a subcarrier spacing and a number of demodulation reference signal occurrences, wherein the subcarrier spacing and the number of demodulation reference signal occurrences are based at least in part on the configuration and a speed of the first wireless device.

19. The method of claim 18, wherein the configuration comprises a set of combinations for the subcarrier spacing and the number of demodulation reference signal occurrences.

20. The method of claim 18, wherein the configuration comprises a first parameter for the subcarrier spacing and a second parameter for the number of demodulation reference signal occurrences.

21. The method of claim 18, wherein the subcarrier spacing and the number of demodulation reference signal occurrences are based at least in part on the speed of the first wireless device exceeding a threshold.

22. The method of claim 18, further comprising:
receiving an indication of the selected subcarrier spacing and the number of demodulation reference signal occurrences.

23. The method of claim 22, wherein the indication is received in a physical uplink shared channel (PUSCH) of the first random access message, in uplink control information on a physical uplink control channel, or both.

24. The method of claim 22, wherein the indication comprises a first parameter for the selected subcarrier spacing and a second parameter for the number of demodulation reference signal occurrences.

25. The method of claim 22, wherein the indication comprises a configuration identification indicating the subcarrier spacing and the number of demodulation reference signal occurrences.

26. The method of claim 22, wherein the indication comprises sequences, frequency position information, or both, for demodulation reference signals corresponding to the number of demodulation reference signal occurrences.

27. The method of claim 18, wherein the configuration is transmitted in a system information message.

28. The method of claim 18, wherein the first wireless device is a user equipment (UE) or a relay node.

29. An apparatus for wireless communications at a wireless device, comprising:

a processor, memory in electronic communication with the processor; and instructions stored in the memory and executable by the processor to cause the apparatus to:

receive a configuration for a first random access message of a two-step random access channel procedure;

select a subcarrier spacing and a number of demodulation reference signal occurrences for transmitting the first random access message based at least in part on the configuration and a speed of the wireless device; and transmit the first random access message of the two-step random access channel procedure using the subcarrier spacing and the number of demodulation reference signal occurrences.

30. An apparatus for wireless communications, comprising:

a processor, memory in electronic communication with the processor; and instructions stored in the memory and executable by the processor to cause the apparatus to:

transmit, to a first wireless device, a configuration for a first random access message of a two-step random access channel procedure; and receive the first random access message of the two-step random access channel procedure using a subcarrier spacing and a number of demodulation reference signal occurrences, wherein the subcarrier spacing and the number of demodulation reference signal occurrences are based at least in part on the configuration and a speed of the first wireless device.

* * * * *